(12) United States Patent
Biskeborn

(10) Patent No.: US 11,226,194 B1
(45) Date of Patent: Jan. 18, 2022

(54) APPARATUS AND METHOD FOR MEASURING DISTANCE BETWEEN FIDUCIAL FEATURES, SUCH AS MAGNETIC TRANSDUCERS, TO AN ACCURACY OF WITHIN ONE NANOMETER

(71) Applicant: International Business Machines Corporation, Armonk, NY (US)

(72) Inventor: Robert Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 16/912,478

(22) Filed: Jun. 25, 2020

(51) Int. Cl.
*G01B 11/06* (2006.01)
*G01B 11/14* (2006.01)
*G01K 13/00* (2021.01)

(52) U.S. Cl.
CPC .............. *G01B 11/14* (2013.01); *G01K 13/00* (2013.01)

(58) Field of Classification Search
CPC ..... G01B 11/0243; G01B 11/02; G01B 11/04; G01B 11/024; G01B 5/0002
USPC ........................................................ 356/634
See application file for complete search history.

(56) References Cited

U.S. PATENT DOCUMENTS

| | | | |
|---|---|---|---|
| 6,157,451 A | 12/2000 | Mizuno | |
| 7,525,593 B2 | 4/2009 | Ichikawa et al. | |
| 8,078,012 B2 | 12/2011 | Abe et al. | |
| 8,115,906 B2 | 2/2012 | Shibazaki | |
| 8,295,584 B2 | 10/2012 | Sato et al. | |
| 8,452,074 B2 | 5/2013 | Tamamushi | |
| 9,529,280 B2 | 12/2016 | Balan | |
| 2002/0018192 A1 | 2/2002 | Nishi | |
| 2018/0046096 A1 | 2/2018 | Shibazaki | |
| 2018/0293720 A1 | 10/2018 | Yoshitake et al. | |
| 2019/0293418 A1 | 9/2019 | Biskeborn | |
| 2019/0362750 A1 | 11/2019 | Biskeborn et al. | |

FOREIGN PATENT DOCUMENTS

| | | |
|---|---|---|
| JP | S6410559 A | 1/1989 |
| JP | H11142118 A | 5/1999 |
| WO | 2009089999 A1 | 7/2009 |

OTHER PUBLICATIONS

Maroufi et al., "MEMS for Nanopositioning: Design and Applications," Journal of Microelectromechanical Systems, vol. 26, No. 3, Jun. 2017, pp. 469-500.
Biskeborn, R.G., U.S. Appl. No. 15/936,171, filed Mar. 26, 2018.
Biskeborn et al., U.S. Appl. No. 15/986,674, filed May 22, 2018.

*Primary Examiner* — Md M Rahman
(74) *Attorney, Agent, or Firm* — Zilka-Kotab, P.C.

(57) ABSTRACT

An apparatus and method for precise and fast measurement of distances between fiducial features of samples such as transducers spans. In one approach, the apparatus includes a sample holder for holding a plurality of discrete samples having fiducial features thereon. The apparatus also includes a device configured to acquire locations of the fiducial features of the samples positioned in the sample holder. An x-y stage is configured to move the sample holder along an x-y plane for selectively positioning a first fiducial feature of a selected one of the samples to within ±10 micrometers or better of a predefined location in a field of view of the device in both x and y directions. A precision stage is configured to control an extent of movement of the selected one of the samples along an axis a predefined distance to an accuracy of about ±50 nanometers or better.

25 Claims, 14 Drawing Sheets

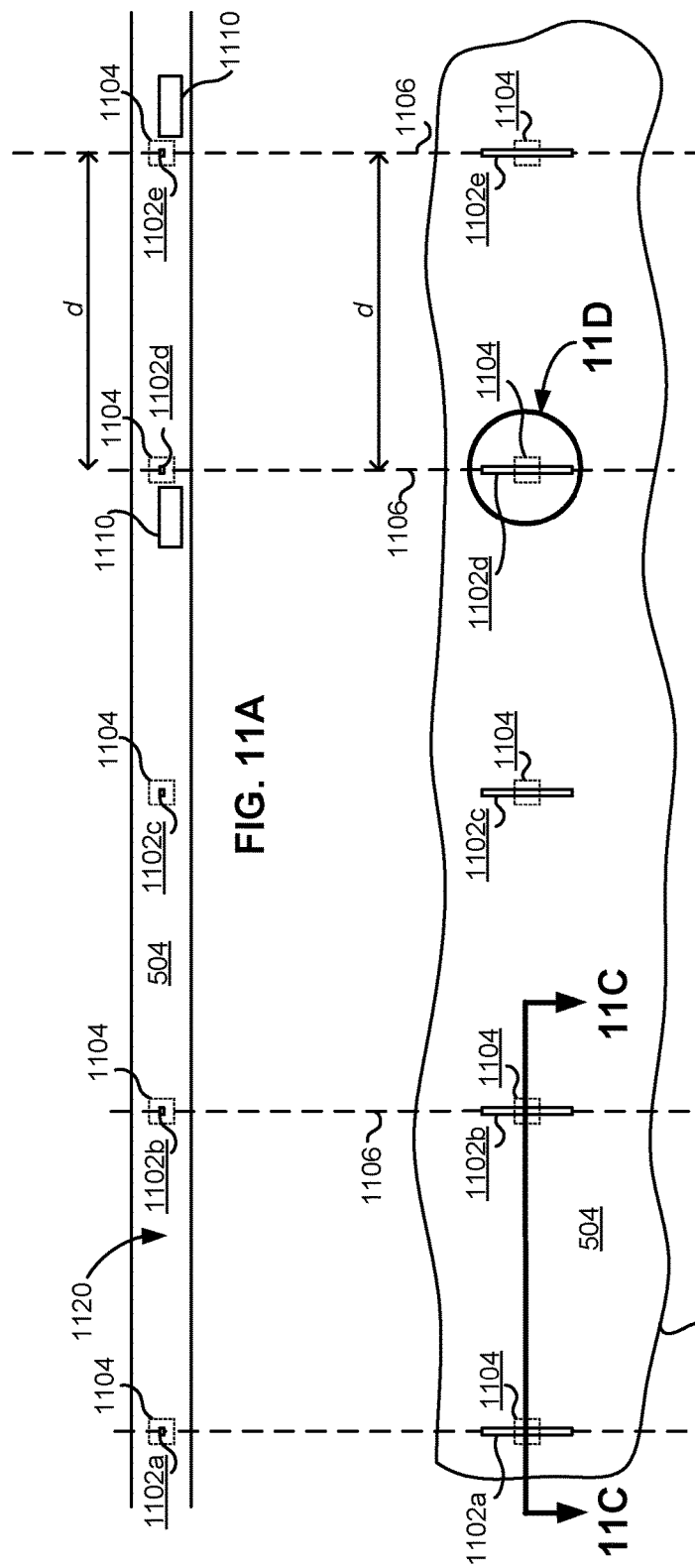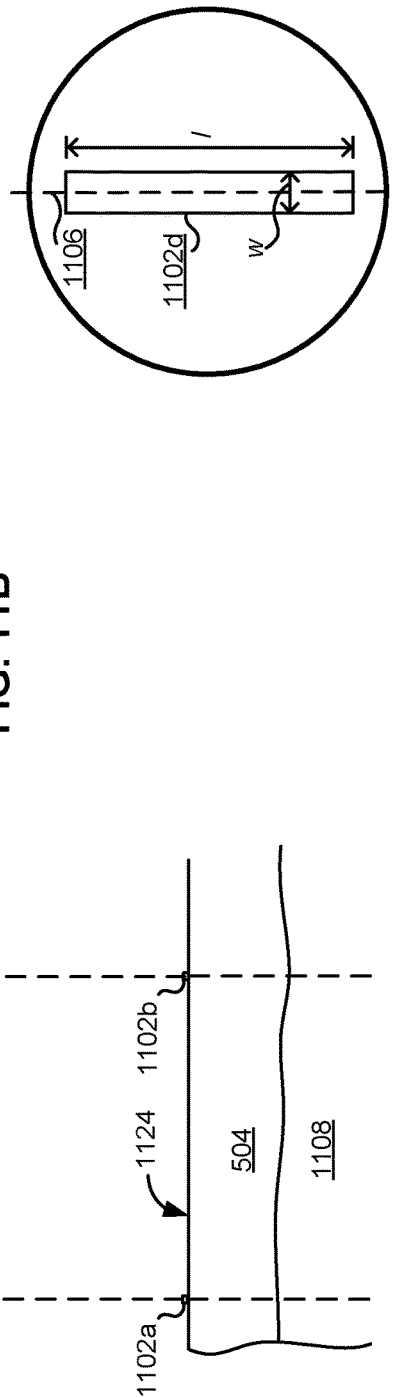

APPARATUS AND METHOD FOR MEASURING DISTANCE BETWEEN FIDUCIAL FEATURES, SUCH AS MAGNETIC TRANSDUCERS, TO AN ACCURACY OF WITHIN ONE NANOMETER

BACKGROUND

The present invention relates to precision measurement, and more particularly, this invention relates to measuring distances between samples, such as a relative head span between magnetic transducers, with nanometer accuracy.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various challenges ranging from the design of tape head assemblies for use in such systems to dealing with tape dimensional instability.

One particularly pressing barrier to growing areal density on magnetic recording tape is the need to budget for track misregistration because of the inherent variability of the span of transducers from module to module. Transducer spans are rarely a perfect match to the design span, and thus tracks are usually written with spacing that is slightly different than the design spacing. Moreover, mismatches in transducer span between a module writing a set of data tracks and a module reading the data tracks results in misregistration of the readers, such as during read-while-write or data readback.

Known ways of addressing these problems are adjusting tape tension to change the width of the tape dynamically during writing and reading, or alternatively by adjusting projected head span by dynamically rotating the head. None of the existing methods are adequate to deal with this issue at modern track densities, much less for future products with higher track densities.

Another proposed method of minimizing misregistration is to determine relative head span (usually expressed as servo-to-servo distance) of each module in a drive, and uploading that informative into the drive memory. Subsequently that information may be used to adjust tape tension or tilt during writing and reading. A problem is that, there have not been drives or means for measuring head spans in a drive other than by using the servo patterns on the tape itself.

A major drawback is this method relies on the servo patterns of a calibration tape being run over the head module, and thus, the procedure tends to be laborious and time consuming, e.g. 10 minutes per module. Moreover, for each head, the process must be recertified to ensure the calibration tape has not changed after each measurement. Finally, this procedure gives only a relative measure of head span.

What is needed is an apparatus and method capable of measuring head span quickly (e.g. <300 seconds) and accurately (e.g. in some approaches down to ±1 nanometer (nm) or better).

SUMMARY

An apparatus, in accordance with one aspect of the present invention, includes a sample holder for holding a plurality of discrete samples having fiducial features thereon. The apparatus also includes a device configured to acquire locations of the fiducial features of the samples positioned in the sample holder. An x-y stage is configured to move the sample holder along an x-y plane for selectively positioning a first fiducial feature of a selected one of the samples to within ±10 micrometers or better of a predefined location in a field of view of the device in both x and y directions. A precision stage is configured to control an extent of movement of the selected one of the samples along an axis a predefined distance to an accuracy of about ±50 nanometers or better, and in some approaches to an accuracy of within ±1 nanometer. The apparatus advantageously enables precise measurement of the distance between any type of fiducial feature, such as the distance between transducers on a magnetic recording head.

In some approaches, the sample holder holds at least three samples arranged in at least two parallel rows. This feature enables batch processing of discrete samples, thereby dramatically reducing the time required to provide accurate measurements to the aforementioned accuracy.

Where the samples include modules for magnetic recording heads, the predefined distance may be a design distance of the span of transducers of the modules. The actual distance of the span of transducers can be accurately measured for each module, and the difference between the actual distance and the design distance determined.

One approach includes a mechanism for causing a relative motion between the device configured to acquire the locations of the fiducial features and the selected one of the samples for adjusting a distance therebetween. This may, for example, be used to move the fiducial features into focus when the device is an optical image capturing device.

In one approach, the precision stage is configured to move between two endpoints, and comprising at least one non-contacting device such as an interferometer. This approach enables accuracy down to 1 nanometer.

A reference standard may be present in the sample holder in some approaches. The reference standard has fiducial features and a defined coefficient of thermal expansion, and a distance between the fiducial features on the reference standard at a particular temperature is known. The reference standard can be used to calibrate the apparatus.

One approach includes a processor and logic configured to process images of the fiducial features of each of the samples for determining a distance between the fiducial features to an accuracy of about ±50 nanometers or better.

Preferred approaches include a mechanism for adjusting an inclination of the sample holder for leveling the sample to be measured to bring the fiducial features of the sample concurrently into a proper position for acquisition by the device. This further ensures accuracy of the measurement, and moreover allows correction of any irregularities in peripheral shape of the sample due to such things as dicing the sample from a wafer.

A method for measuring distances between fiducial features of samples, in accordance with one aspect of the present invention, includes adjusting an inclination of a precision stage to a predefined orientation relative to a device configured to acquire locations of the fiducial features of a sample in a sample holder coupled to the precision stage. The precision stage is configured to control an extent of movement of the sample along an axis for moving the sample along the axis a precise predefined distance to within an accuracy of about ±50 nanometers or better. An x-y stage is instructed to move the sample holder to position a first fiducial feature of the sample to within ±10 micrometers or better of a predefined location in a field of view of the device. The inclination of the sample holder is adjusted for leveling the sample to be measured to bring the fiducial features of the sample concurrently into a proper position for acquisition by the device. The device is instructed to acquire a location of the first fiducial feature. In response to repositioning of the sample the precise predefined distance along the axis by the precision stage, the device is instructed to acquire a location of a second fiducial feature in the field of view of the device. The distance between the first fiducial feature and the second fiducial feature is computed based on the locations to an accuracy of about ±50 nanometers or better. The computed distance is output. The foregoing operations are repeated for additional samples positioned in the sample holder. The method advantageously enables precise measurement of the distance between any type of fiducial feature, such as the distance between transducers on a magnetic recording head.

Other aspects of the present invention will become apparent from the following detailed description, which, when taken in conjunction with the drawings, illustrate by way of example the principles of the invention.

BRIEF DESCRIPTION OF THE DRAWINGS

FIGS. 11A-11D depict various views of a sample having fiducial features that enable measuring of the span between fiducial features.

DETAILED DESCRIPTION

Figure 1A:
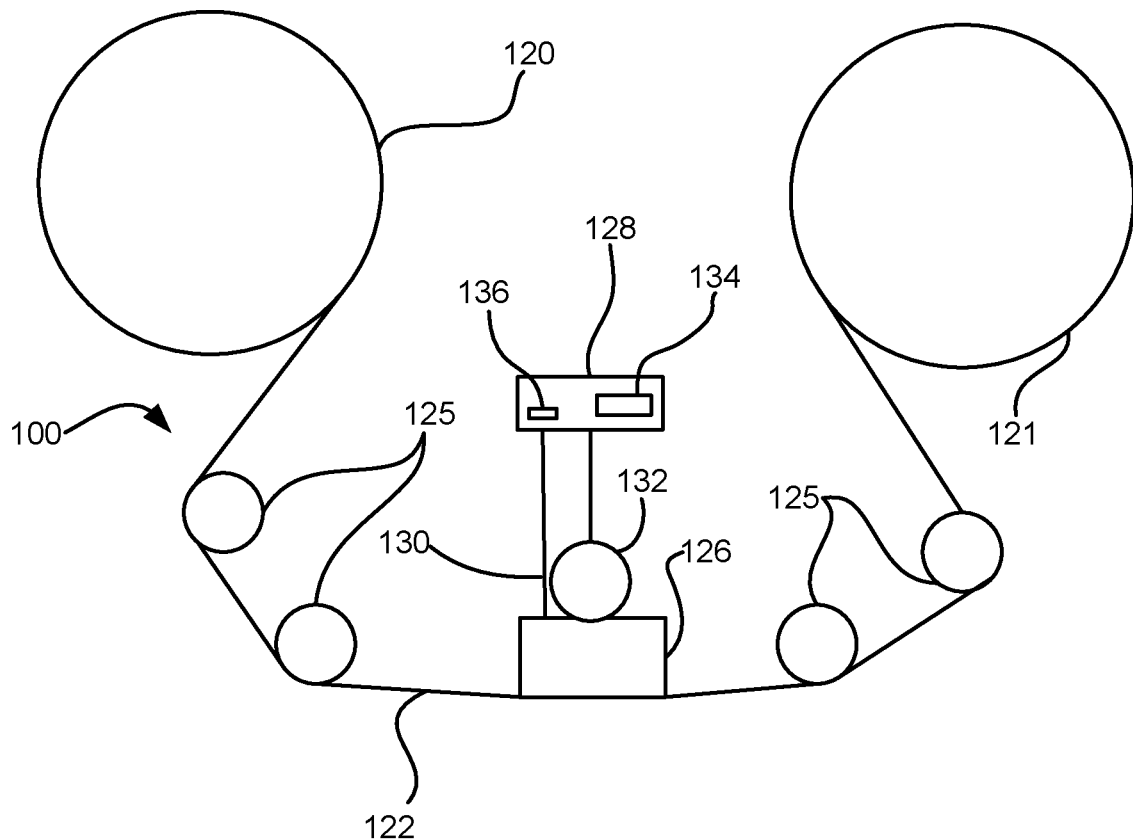
FIG. 1A is a schematic diagram of a simplified tape drive system, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred aspects of an apparatus for precision measurement, as well as operation and/or component parts thereof.

In one general aspect, an apparatus includes a sample holder for holding a plurality of discrete samples having fiducial features thereon. The apparatus also includes a device configured to acquire locations of the fiducial features of the samples positioned in the sample holder. An x-y stage is configured to move the sample holder along an x-y plane for selectively positioning a first fiducial feature of a selected one of the samples to within ±10 micrometers or better of a predefined location in a field of view of the device in both x and y directions. A precision stage is configured to control an extent of movement of the selected one of the samples along an axis a predefined distance to an accuracy of about ±50 nanometers or better, and in some approaches to an accuracy of within ±1 nanometer.

In another general aspect, a method for measuring distances between fiducial features of samples includes adjusting an inclination of a precision stage to a predefined orientation relative to a device configured to acquire locations of the fiducial features of a sample in a sample holder coupled to the precision stage. The precision stage is configured to control an extent of movement of the sample along an axis for moving the sample along the axis a precise predefined distance to within an accuracy of about ±50 nanometers or better. An x-y stage is instructed to move the sample holder to position a first fiducial feature of the sample to within ±10 micrometers or better of a predefined location in a field of view of the device. The inclination of the sample holder is adjusted for leveling the sample to be measured to bring the fiducial features of the sample concurrently into a proper position for acquisition by the device. The device is instructed to acquire a location of the first fiducial feature. In response to repositioning of the sample the precise predefined distance along the axis by the precision stage, the device is instructed to acquire a location of a second fiducial feature in the field of view of the device. The distance between the first fiducial feature and the second fiducial feature is computed based on the locations to an accuracy of about ±50 nanometers or better. The computed distance is output. The foregoing operations are repeated for additional samples positioned in the sample holder.

FIG. 1A illustrates a simplified tape drive 100 of a tape-based data storage system, which may be employed in the context of the present invention. While one specific implementation of a tape drive is shown in FIG. 1A, it should be noted that the aspects described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of read transducers (also referred to as readers), write transducers (also known in the art as writers), or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various approaches. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
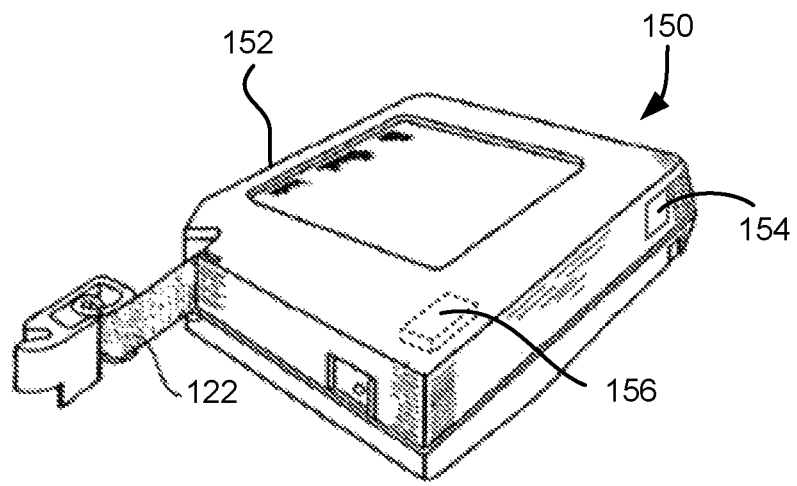
FIG. 1B is a schematic diagram of a tape cartridge, in accordance with one approach.

FIG. 1B illustrates an exemplary tape cartridge 150. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred approach, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
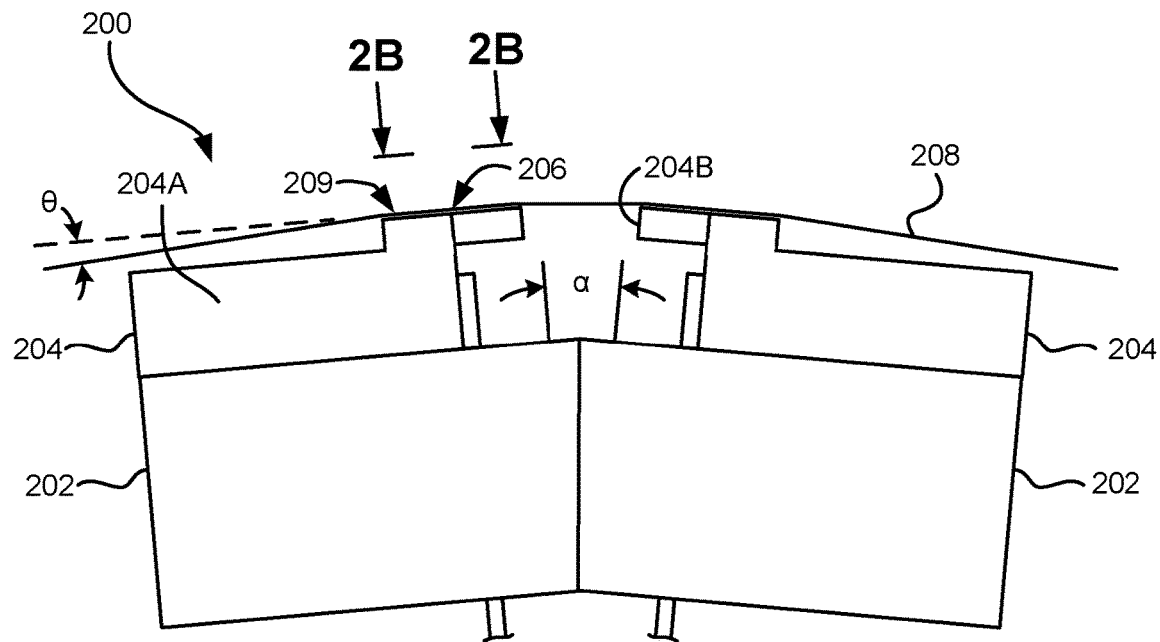
FIG. 2A illustrates a side view of a flat-lapped, bi-directional, two-module magnetic tape head, in accordance with one approach.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the read transducers and/or write transducers 206 are formed. In use, a tape 208 is moved over the modules 204 along a media (tape) bearing surface 209 in the manner shown for reading and writing data on the tape 208 using the read transducers and write transducers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The read transducers and write transducers may be arranged in a piggyback or merged configuration. An illustrative piggybacked configuration comprises a (magnetically inductive) write transducer on top of (or below) a (magnetically shielded) read transducer (e.g., a magnetoresistive reader, etc.), wherein the poles of the write transducer and the shields of the read transducer are generally separated. An illustrative merged configuration comprises one reader shield in the same physical layer as one writer pole (hence, "merged"). The read transducers and write transducers may also be arranged in an interleaved configuration. Alternatively, each array of channels may be read transducers or write transducers only. Any of these arrays may contain one or more servo readers for reading servo data on the medium.

Figure 2B:
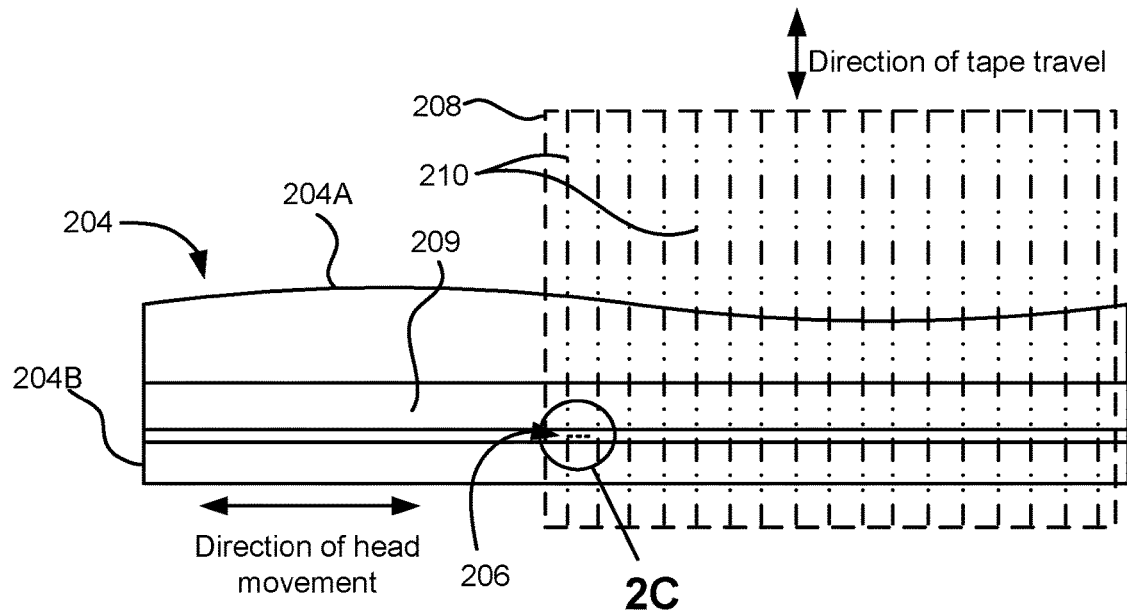
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the read transducers and/or write transducers 206 are positioned to specific track positions within one of the data bands. Outer readers, sometimes called servo readers, read the servo tracks 210. The servo signals are in turn used in a conventional manner to keep the read transducers and/or write transducers 206 aligned with a particular set of tracks during the read/write operations.

Figure 2C:
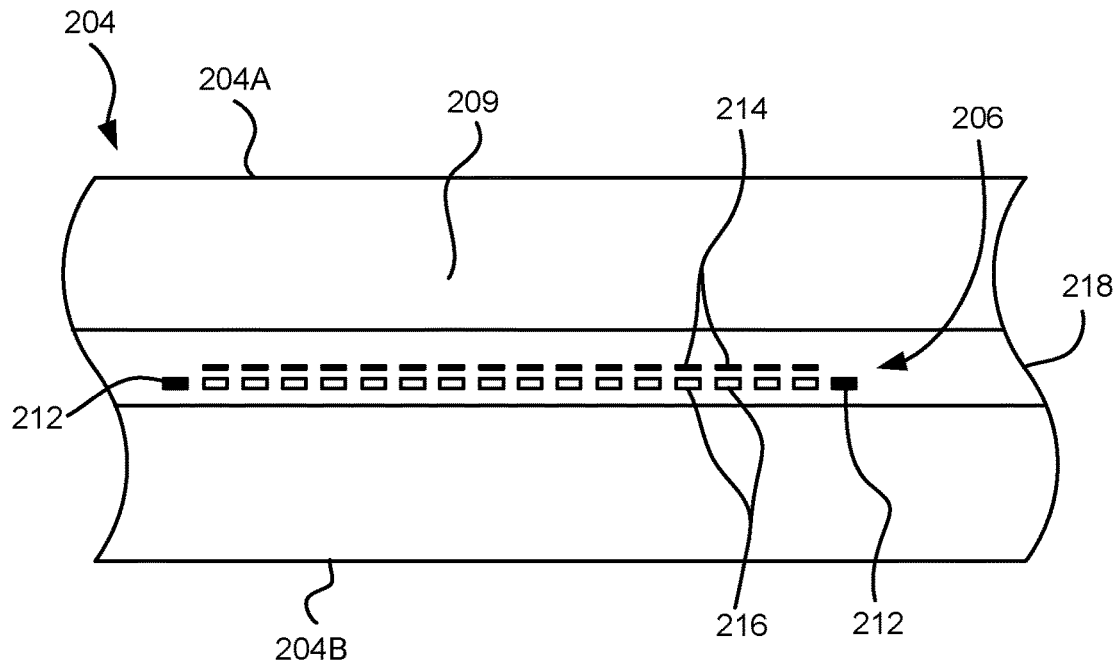
FIG. 2C is a detailed view taken from Circle 2C of FIG. 2B.

FIG. 2C depicts a plurality of read transducers and/or write transducers 206 formed in a gap 218 on the module 204 in Circle 2C of FIG. 2B. As shown in FIG. 2C, the array of read transducers and write transducers 206 includes, for example, 16 write transducers 214, 16 read transducers 216 and two servo readers 212, though the number of elements may vary. Illustrative approaches include 8, 16, 32, 40, and 64 active read transducers and/or write transducers 206 per array, and alternatively interleaved designs having odd numbers of read transducers or write transducers such as 17, 25, 33, etc. An illustrative approach includes 32 read transducers per array and/or 32 write transducers per array, where the actual number of transducer elements could be greater, e.g., 33, 34, etc. Multiple simultaneously-operated transducers allow the tape to travel at a modest velocity while maintaining a high data transfer rate. Lower velocities are desirable to reduce mechanical difficulties from speed-induced tracking.

While the read transducers and write transducers may be arranged in a piggyback configuration as shown in FIG. 2C, the read transducers 216 and write transducers 214 may also be arranged in an interleaved configuration. Alternatively, each array of read transducers and/or write transducers 206 may be read transducers or write transducers only, and the arrays may contain one or more servo readers 212. As noted by considering FIGS. 2A and 2B-2C together, each module 204 may include a complementary set of read transducers and/or write transducers 206 for such things as bi-directional reading and writing, read-while-write capability, backward compatibility, etc.

Figure 2D:
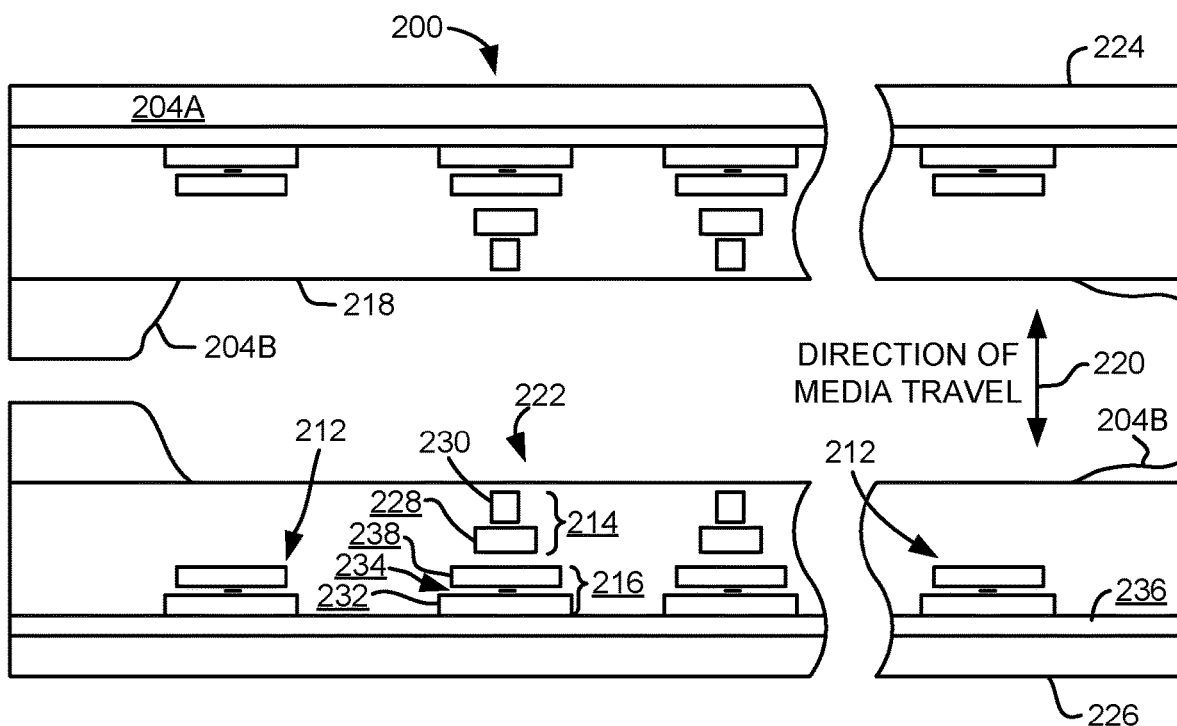
FIG. 2D is a detailed view of a partial tape bearing surface of a pair of modules.

FIG. 2D shows a partial tape bearing surface view of complementary modules of a magnetic tape head 200 according to one approach. In this approach, each module has a plurality of read/write (R/W) pairs in a piggyback configuration formed on a common substrate 204A and an optional electrically insulative insulating layer 236. The write transducers 214 and the read transducers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the write transducer of the leading module and read transducer of the trailing module aligned with the write transducer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (e.g., ~80/20 at % NiFe, also known as permalloy), cobalt zirconium tantalum (CZT) or Al—Fe—Si (Sendust), a sensor 234 for sensing a data track on a magnetic medium, a second shield 238 typically of a nickel-iron alloy (e.g., permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as CoFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
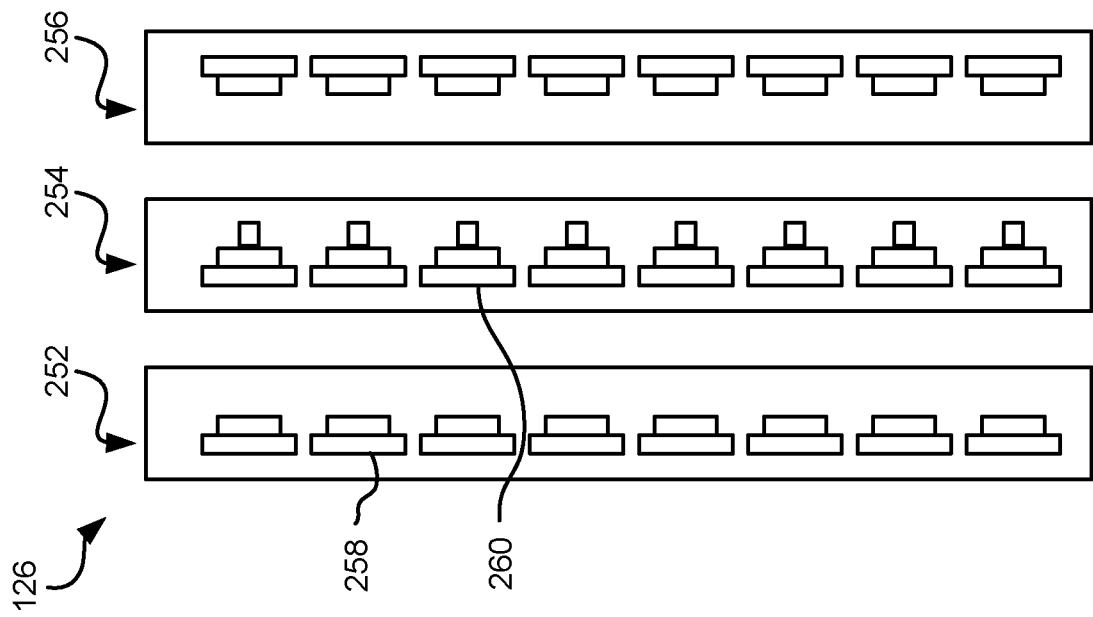
FIG. 4 is a partial tape bearing surface view of a magnetic head having a read-write-read configuration.
Figure 3:
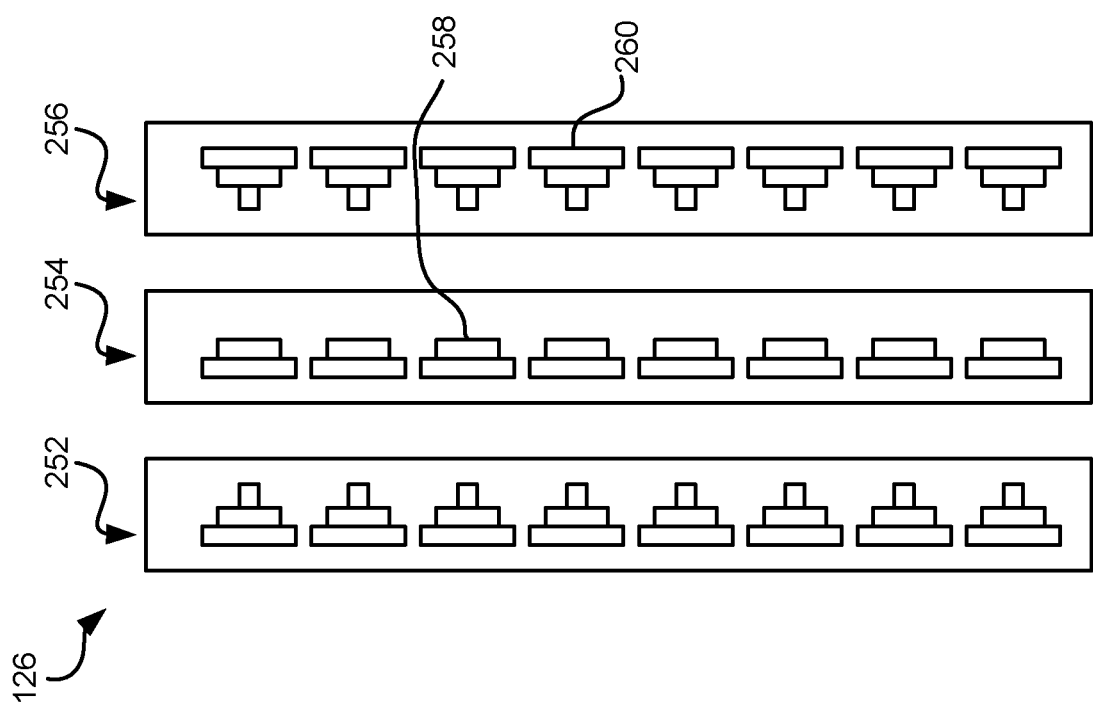
FIG. 3 is a partial tape bearing surface view of a magnetic head having a write-read-write configuration.

The configuration of the tape head 126 according to one approach includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of write transducers 260. The inner module 254 of FIG. 3 includes one or more arrays of read transducers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify approaches usable with the present invention. One skilled in the art apprised with the teachings herein will appreciate how permutations of the present invention would apply to configurations other than a W-R-W configuration.

As mentioned above, increasing areal density on magnetic recording tape has been significantly limited by the need to budget for track misregistration related to variability of the span of transducers from module to module. As noted above, a few known approaches for addressing this issue include adjusting tape tension to change the width of the tape dynamically during writing and reading, adjusting projected head span by dynamically rotating the head, and estimating transducer span using a calibration tape to acquire values for performing the foregoing adjustments. However, none of these approaches are effective in dealing with the issue completely, and all these prior methods have limitations.

According to one aspect of the present invention, an apparatus is provided that measures absolute distance between features of a sample. Such apparatus can determine transducer span of a magnetic recording head module without reliance on magnetic tape. In another aspect, the apparatus performs a method that generally includes indexing a plurality of samples such as head modules to precisely position each module in the field of view of a device configured to acquire locations of the fiducial features of the module. The module in the field of view is imaged at a first position, indexed along a single-axis using a precision stage to a second position, and imaged again. A fiducial feature of the module is captured in each image, and the position of one or both fiducial features in the associated image is correlated to the distance between the first and second positions to determine the actual head span to within about ±50 nm or better, preferably ±25 nm or better, more preferably ±10 nm or better, even more preferably ±5 nm or better, and ideally ±1 nm or better. Each module is processed quickly, in less than 300 seconds, more preferably in less than 100 seconds, and ideally in less than 60 seconds.

Figure 5A:
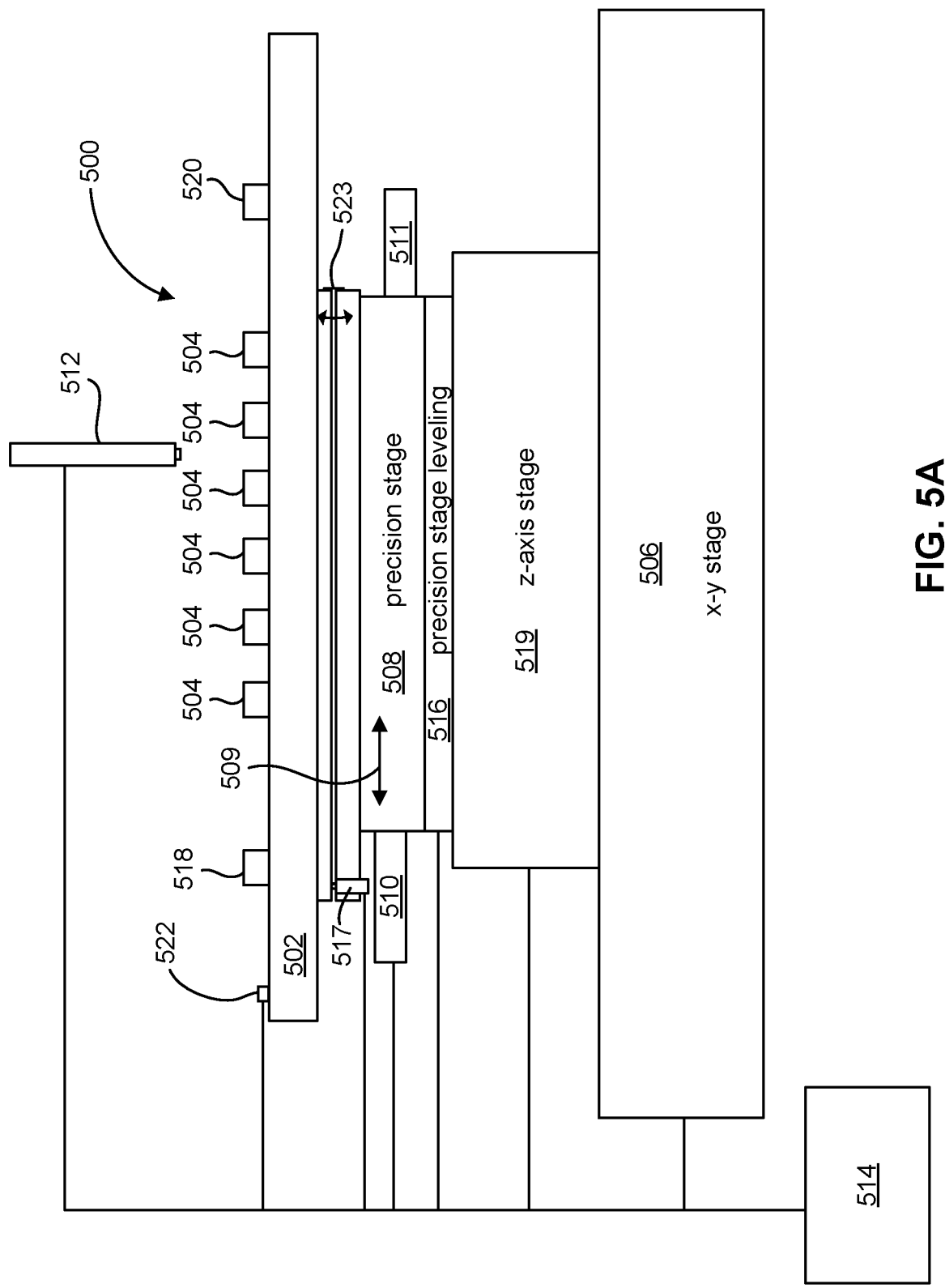
FIG. 5A is a schematic diagram of an apparatus, in accordance with one approach.

FIG. 5A depicts an apparatus 500 for measuring distances between features of a sample, such as a relative head span between magnetic transducers, with nanometer accuracy, in accordance with one aspect of the present invention. As an option, the present apparatus 500 may be implemented in conjunction with features from any other approach listed herein, such as those described with reference to the other FIGS. Of course, however, such apparatus 500 and others presented herein may be used in various applications and/or in permutations which may or may not be specifically described in the illustrative approaches listed herein. Further, the apparatus 500 presented herein may be used in any desired environment.

In various approaches, the apparatus 500 may include more, less, and/or other features and components than those shown in FIG. 5A.

The apparatus 500 includes a sample holder 502 for holding a plurality of samples 504 to be measured, such as modules or magnetic recording heads (where each head includes at least two modules). As described herein, the samples 504 include at least some thin films, and may include a substrate of any type, e.g., a wafer, with thin films thereon. Equivalently, any item may be a sample to be measured, i.e., the apparatus 500 may be used with samples that are not thin film structures per se.

Preferably, the sample holder 502 holds at least ten discrete samples 504 arranged in at least two parallel rows. In some approaches, the sample holder 502 can hold dozens of modules.

The samples 504 may simply rest in the sample holder 502, but are preferably held in their respective locations by vacuum or other low strain technique of a type known in the art.

Figure 10:
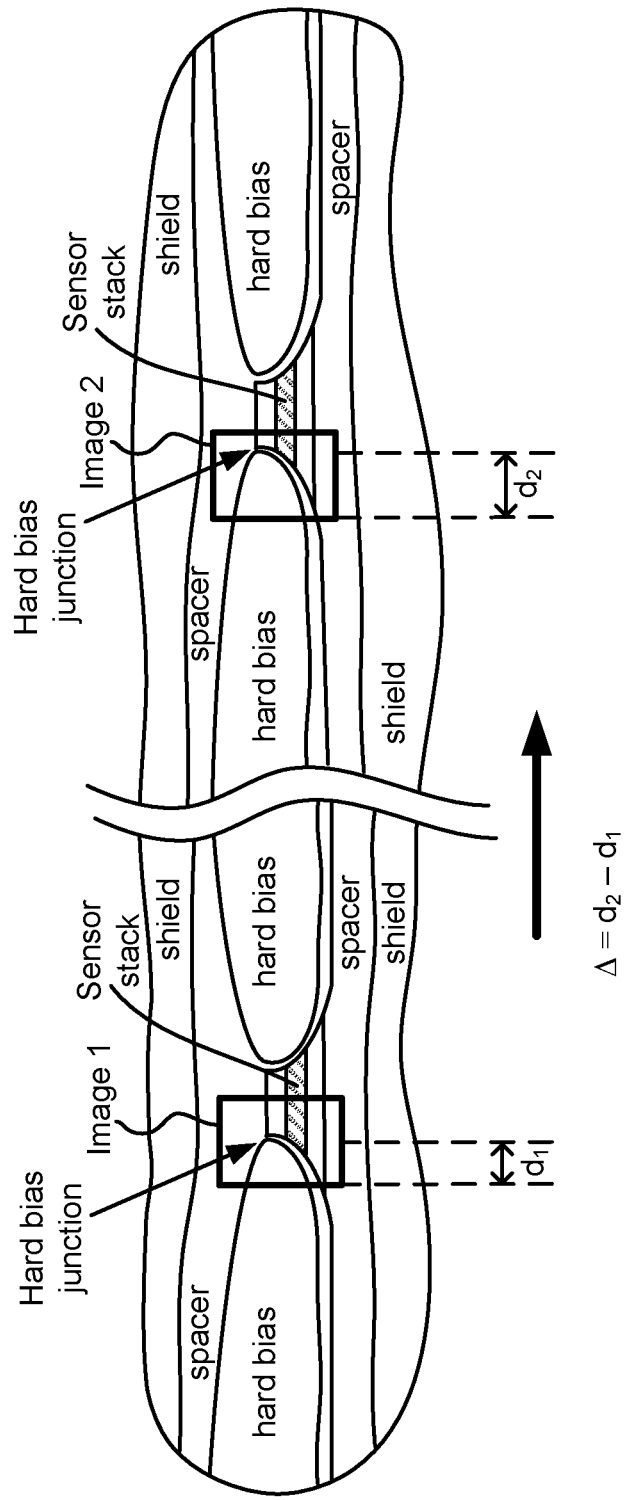
FIG. 10 is a partial side view depicting an example of using existing features of a sample as fiducial features.

Each sample 504 has at least a pair of features, referred to herein as fiducial features, that are optically detectable. FIG. 10 and related description below describes the concept of, and examples of, fiducial features being features of active thin film elements in the sample 504. FIGS. 11A-12C and related description below describe the concept of, and examples of, fiducial features added to the sample 504 but having no other purpose therein. In a preferred arrangement, the fiducial features are located proximate to the features to be measured, for example, the distal transducers in an array of transducers for the tape head module. The distal elements are typically servo reader elements, which for LTO are spaced 2859 micrometers apart.

Referring again to FIG. 5A, the sample holder 502 is coupled to an x-y stage 506. The x-y stage 506 is configured to allow positioning of the sample holder 502 along an x-y plane for selectively positioning each sample 504 (e.g., module) at a target position (e.g., in the field of view of the later-described device configured to acquire locations of the fiducial features of the samples) with an accuracy of ±10 micrometers or better. Moreover, the apparatus 500 is configured to identify and position a first fiducial feature of each sample 504 in a predefined location (e.g., the center) in a field of view of the device, preferably to ±10 micrometers or better, more preferably to within ±2 micrometers or better, and ideally to within ±0.25 micrometers or better, in both x and y directions, by moving the sample holder 502 using the x-y stage 506 in conjunction with data received from the device configured to acquire locations of the fiducial features of the samples positioned in the sample holder. Preferably, the x-y stage 506 is capable of moving tens of millimeters, and in some approaches up to several centimeters, to thereby properly position the first fiducial features for the array of samples 504.

The apparatus 500 also includes a precision stage 508 that is configured to control an extent of movement of a sample 504 along at least a single axis 509 by a precise predefined distance, e.g., between two endpoints that define the predefined distance. The precise predefined distance may correspond to the design distance between features of the sample 504 to be measured. For example, the precise predefined distance may be approximately 3 millimeters, which is the design distance of the actual span of transducers in an exemplary module, to within an accuracy of about ±50 nm or better, preferably ±25 nm or better, more preferably ±10 nm or better, even more preferably ±5 nm or better, and ideally approximately ±1 nm or better.

In one exemplary approach, the sample 504 having the fiducial features may be loaded onto a stage of the apparatus 500 and the first fiducial feature of the sample 504 is positioned under a device 512 configured to acquire locations of the fiducial features of the samples positioned in the sample holder. Then the apparatus 500 causes the stage to move exactly 3 mm, which moves the sample 504 under the device 512 such that a second fiducial feature is under the device 512. The distance between fiducials can be discerned from the images of the first and second fiducial features, in conjunction with the known precise distance of movement by the precision stage 508. More details about how to use image data to discern distance is provided below.

The precision stage 508 may be positioned anywhere that enables movement of the samples 504 in the desired direction for enabling imaging of the fiducial features of the sample 504 before and after movement the precise distance. In one approach, the precision stage 508 is positioned between the x-y stage 506 and the sample holder 502, to enable precise movement of sample holder 502. In another approach, the precision stage 508 moves the x-y stage 506 and sample holder 502 together. In yet another approach, the precision stage 508 may be integrated with the sample holder 502 for moving all or some subset of the samples 504 therein the precise distance.

As an option, a mechanism 510 of known type may be present for causing a relative motion between the device 512 configured to acquire the locations of the fiducial features and the sample being measured. In a preferred approach, the mechanism 510 causes motion of the precision stage 508 along the single axis, e.g., by applying force to the precision stage 508 or to the sample holder 502. Note that reference to movement of the precision stage 508 along the single axis generally refers to movement of a portion of the precision stage 508 along the single axis, such as a portion of the precision stage coupled to the sample holder 502, and not necessarily the entire precision stage. Examples of mechanisms 510 include worm screws, actuators, cantilevers, etc. However, in other approaches, the precision stage 508 may be made to move manually, e.g., by a user pushing the precision stage 508 or the sample holder 502.

In one approach, the precision stage 508 may be configured to move between two stops, where the two stops define extents of movement of the precision stage 508 to the precise distance.

In another approach, the precision stage 508 may be configured to move between endpoints according to, at least in part, at least one noncontacting device for detecting a position of the precision stage. As inferred from the name, the noncontacting device does not contact the moving portion of the precision stage. In one approach, the noncontacting device is an endpoint detector that detects when the precision stage reaches an endpoint. While any known suitable position-detecting noncontacting device(s) may be used, such as a laser doppler device, a capacitance probe, an inductance probe, an optical probe, etc., preferred approaches use one or more interferometers 511 that enable measurement of the motion of the precision stage 508 to within 1 nm or better, thereby enabling measurement of the distance between fiducial features of the sample 504 to within the ranges disclosed herein, and in some approaches, down to ±1 nm or better.

In various approaches, the apparatus 500 may have one or more interferometers 511 located on least one of the following: the x-y stage 506 (as shown), the precision stage 508, or in a different location on the apparatus 500. The interferometer 511 may be used in a conventional manner to detect the extent of motion of the precision stage, the end of motion of the precision stage, etc.

In one approach, the precisions stage includes a fixture that includes a first rod fixed to the moveable portion of the precision stage 508. The first rod may be cylindrical, but could have other shapes. The first rod is preferably very hard, e.g., of a known hard material such as polycrystalline alumina or comparable material. Two parallel rods may be positioned orthogonally to and on either side of the first rod. In one approach, the two parallel rods may be arranged to establish end points for the motion of the precision stage 508. In one approach, the two parallel rods have similar shape and/or composition as the first rod, but can be different.

In one approach, the parallel rods are supported by support structures. In one approach, the material of the support structures includes a material selected from the group consisting of: titanium, sapphire, quartz, and AlTiC or equivalently, a like material. In another approach, the material of the support structures includes a material that has a coefficient of thermal expansion similar to the sample 504, e.g., tape head module.

Figure 6:
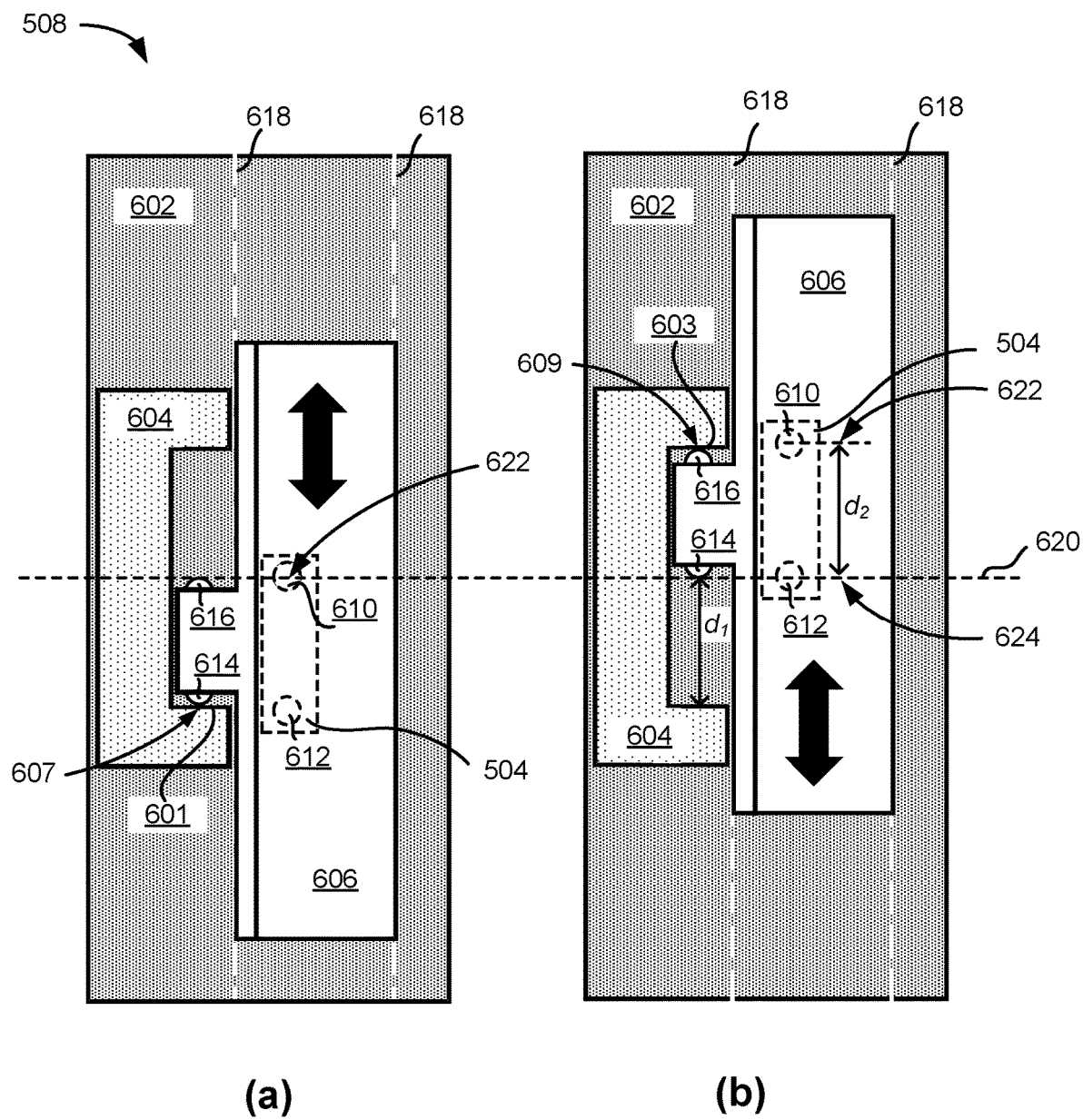
FIG. 6 is a schematic drawing of a top view of a precision stage, in accordance with one approach.

FIG. 6 depicts a precision stage 508 for controlling an extent of movement of a sample a precise distance in the field of view of a device configured to acquire locations of the fiducial features of the sample, in accordance with one approach. As an option, the present precision stage 508 may be implemented in conjunction with features from any other approach listed herein, such as those described with reference to the other FIGS. Of course, however, such a precision stage 508 and others presented herein may be used in various applications and/or in permutations which may or may not be specifically described in the illustrative approaches listed herein. Further, the precision stage 508 presented herein may be used in any desired environment.

According to one approach, a precision stage 508 includes a base 602 and a movable portion 606 positioned above the base 602 and configured to move relative to the base linearly (in a longitudinal direction arrow) along the base 602. The extent of motion of the movable portion 606 is constrained by stops. In some approaches, a precise distance ch, or step, between two positions may define the extent of motion of the movable portion 606, as exemplified by FIG. 6, parts (a) and (b). In some approaches, the movable portion 606 may be a linear motion device (e.g. a slide).

In some approaches, a guide 604 (e.g. a yoke, a u-shaped bracket, etc.) may set the positions of each flat stop 601, 603. In some approaches, the guide 604 may be fixedly attached to the base 602. The flat stops 601, 603 may define the extent of motion of the movable portion 606 relative to the stops 614, 616 of the movable portion 606. In other approaches, the movable portion 606 may set the position of the stops 614, 616 of the movable portion 606 to define the extent of motion of the movable portion 606 between the flat stops 601, 603 of the guide 604.

In one approach, the sample holder 502 (not shown in FIG. 6) of the apparatus 500 (FIG. 5A) is coupled to the moveable portion 606, and a fiducial feature 610 of a sample 504 is positioned under a device configured to acquire locations of the fiducial features of a sample as described elsewhere herein, e.g., by an x-y stage. An illustrative sample 504 is shown in FIG. 6 in shadow. Images of the fiducial features 610, 612 of the sample 504 can be acquired when the movable portion 606 is in the first and second positions. Because the precise amount of movement of the movable portion 606, and thus the sample 504, is known, accurate measurements between fiducial features appearing in the image at the first and second positions can be made.

In some approaches, the extent of motion may be defined by limits of movement of a movable portion to a predefined distance ch. The predefined distance ch may be an expected distance between two features to be measured. According to one approach, the extent of motion may be within 10 nm of a predefined distance $d_1$ of greater than 1 mm, and preferably to within one nanometer.

The range of motion of the movable portion 606 may be constrained by stops 614, 616 of any kind, thereby defining the extent of motion of the movable portion 606 relative to the base 602. In some approaches, as shown in FIG. 6, stops 614, 616 may be on the movable portion 606. In other approaches, stops may be on the base 602. In further approaches, the stops may be on a guide coupled to the base 602. Any type of stop which would become apparent to one skilled in the art upon reading the present description may be used to precisely set the extent of motion of the movable portion 606.

Linear motion of the movable portion 606 may be ensured by any mechanism that would become apparent to one skilled in the art upon reading the present description. For example, the movable portion may slide along a channel in the base. In other approaches, the movable portion may slide between guides coupled to the base. In further approaches, the movable portion may slide along a rail that extends through the movable portion.

In the approach shown in FIG. 6, the movable portion 606 is configured to move along a track 618 in a direction (arrow) parallel to a guide 604. The guide 604 has flat stops 601, 603 for engaging the stops 614, 616 on the movable portion 606.

Continuing with the exemplary approach shown in FIG. 6, a predefined distance $d_1$ may be set as the distance between the initial position (FIG. 6, part (a)) of the first stop 614 of the movable portion 606 when the first stop 614 forms a point of engagement 607 with the first flat stop 601 of the guide 604 and the final position (FIG. 6, part (b)) of the first stop 614 of the movable portion when the second stop 616 forms a point of engagement 609 with the second flat stop 603 of the guide 604.

The predefined distance $d_1$ may be set permanently, may be adjustable, may be resettable, etc. The predefined distance $d_1$ may be set, detected, calibrated and/or adjusted using precise measurement techniques known by one skilled in the art, for example, an interferometer, gauge blocks, etc.

In one approach, the predefined distance $d_1$ may be set by using predefined stop positions that provide the desired distance. In some approaches, the predefined distance may be set by machining at least one of the flat stops 601, 603 that create the point of engagement 607, 609 with the stops 614, 616 on the movable portion, respectively. In other approaches, at least one of the stops is machined to alter its profile. In further approaches, one or more of the stops may be replaceable to adjust the extent of motion.

In some approaches, at least one of the stops 614, 616 and/or flat stops 601, 603 may be adjustable for changing the extent of motion of the movable portion. For example, and not meant to be limiting in any way, if a specific measurement of distance is desired between two features of a sample, one of the stops may be adjusted to set a predefined distance, e.g., by a worm screw that extends through the guide 604. In one approach, an interferometer may be used to help precisely position one of the stops relative to the other, e.g., to within approximately a nanometer of the target distance.

Once the stops 614, 616, 601, 603 are in their final state, calibrations using the aforementioned precise measurement techniques may be used to determine the precise distance 4 and any offset from the design distance can be considered and/or compensated for during use, using known techniques.

Various factors may affect the actual extent of motion of the movable portion from an initial position (part (a) of FIG. 6) to a final position (part (b) of FIG. 6) compared to a predefined distance $d_1$. Factors that may affect the extent of motion are temperature of the apparatus, temperature of the movable portion, force of engagement of at least one of the stops with the opposing component, wear over time, etc. Accordingly, preferred approaches include features directed at minimizing the effects of the aforementioned factors.

According to one approach, stops may be comprised of a material with a hardness on the Mohr scale of at least 9. The Mohr scale is a scale between 1 and 10 of hardness of materials with 1 having the least hardness and 10 having the greatest hardness. In some approaches, the stops include corundum (e.g., sapphire), diamond, a combination thereof, etc. In some approaches, the stops may include Invar (e.g. a nickel-iron alloy with a coefficient of thermal expansion of about 1.2 ppm/° C.). In yet other approaches, the stops may include hardened steel.

Changes in temperature may affect the expansion and contraction of the material to be measured. Thus, according to various approaches, components of the apparatus may include a material with a coefficient of thermal expansion near zero at room temperature. In some approaches, the stops, movable portion and/or guide may include a material with a thermal expansion coefficient near zero at room temperature, e.g., Invar. For purposes of these approaches, room temperature is defined as between 20° to 25° C. A coefficient of thermal expansion near zero is defined to be at most 1 to 2 ppm/° C.

Also, the selected temperature of operation should be maintained to within one-quarter of one degree C., preferably better. In some approaches, a temperature sensor may be used to detect a temperature in a vicinity of the precision stage 508, e.g., the ambient temperature, the temperature of the sample, the temperature of precision stage 508, etc. In some approaches, a temperature sensor for detecting a temperature of the movable portion may be positioned in or on the movable portion 606. The temperature reading may provide an indication of any extent of thermal expansion or contraction of the apparatus and/or sample, and appropriate actions can be taken, such as taking remedial measures, or performing the desired imaging. In preferred approaches, the apparatus functions in a temperature-controlled environment, thereby allowing use of the apparatus under optimal conditions.

In some approaches, the predefined distance $d_1$ may be determined from an expected distance between fiducial features of a sample 504. Particularly, the predefined distance $d_1$ may correspond to an ideal, or design, distance between a first fiducial feature 610 and a second feature 612 of the sample 504. For example, and not meant to be limiting in any way, the servo reader spacing (e.g., center to center distance between two servo readers) on a tape head module is 2859 µm (according to LTO specifications). Thus, as shown in FIG. 6, the extent of motion may be set to a predefined distance $d_1$ of 2859 µm such that the movement of the movable portion 606 is constrained by the stops 614, 616 between points of engagement 607, 609 at the flat stops 601, 603 of a guide 604. In some approaches, at least one of the stops 614, 616 may be adjusted so that the predefined distance $d_1$ measures precisely 2859 µm.

As shown, part (a) of FIG. 6 depicts an initial position of the movable portion 606 and the representative position of a sample 504 having fiducial features 610, 612 in the undepicted sample holder. In the initial position, the first fiducial feature 610 may be in a first position 622 aligned with an imaginary reference line 620. The reference line may be approximately the center of the field of view of the device configured to acquire locations of the fiducial features of the sample (not shown). The first position 622 of the first fiducial feature 610 on reference line 620 is set according to the stop 614 of the movable portion 606 having a point of engagement 607 with the flat stop 601 of a guide 604. An image of the first fiducial feature 610 of the sample 504 at the first position 622 may be generated.

Part (b) of FIG. 6 depicts the result of movement of the movable portion 606 according to a predefined distance $d_1$ in which the stop 616 of the movable portion 606 reaches a point of engagement 609 with the flat stop 603 of the guide 604. As shown, the second fiducial feature 612 is now positioned near or on the reference line 620. An image of the second fiducial feature 612 of the sample 504 at the second position 624 may be generated after movement of the movable portion the predefined distance $d_1$.

From these images, the actual distance $d_2$ between the first and second fiducial features 610, 612 may be determined. For example, a misregistration between the image generated of the first feature 610 at the first position 622 and of the second feature 612 at the second position 624 may be determined, e.g., using a technique described below. In some approaches, the distance $d_2$ may be the predefined distance $d_1$ adjusted for misregistration of the actual position of the second feature 612 (according to the first feature 610, according to a reference line 620, etc.).

In some approaches, a comparison of the actual second position 624 of the second feature 612 to the expected position of the second feature (according to a reference line 620, according to the first position 622 of the first feature 610, etc.) may generate a correction of the distance between the first feature 610 and the second feature 612 and provide a precise measurement of the distance $d_2$ between the first feature 610 and the second feature 612 of the sample 504 (e.g. the actual servo reader spacing of a tape head module). The description of FIG. 9 describes an approach of a detailed method of determining the actual distance between features with nanometer precision.

In various approaches described herein, the precise distance in millimeters between micron-sized features may be determined to within ±1 nanometer of precision. In some approaches, the precise distance may be measured between two micron-sized features within 1 nanometer. In other approaches, the precise distance between three or more micron-sized features may be measured to within 1 nanometer. In some approaches, the features may be components of a transducer array (e.g. servo reader transducers, data reader transducers, writer transducers, etc.). In other approaches, the features may be components of the tape head module. These approaches are presented by example and are not meant to be limiting in any way to one who is skilled in the art upon reading this description.

Figure 7:
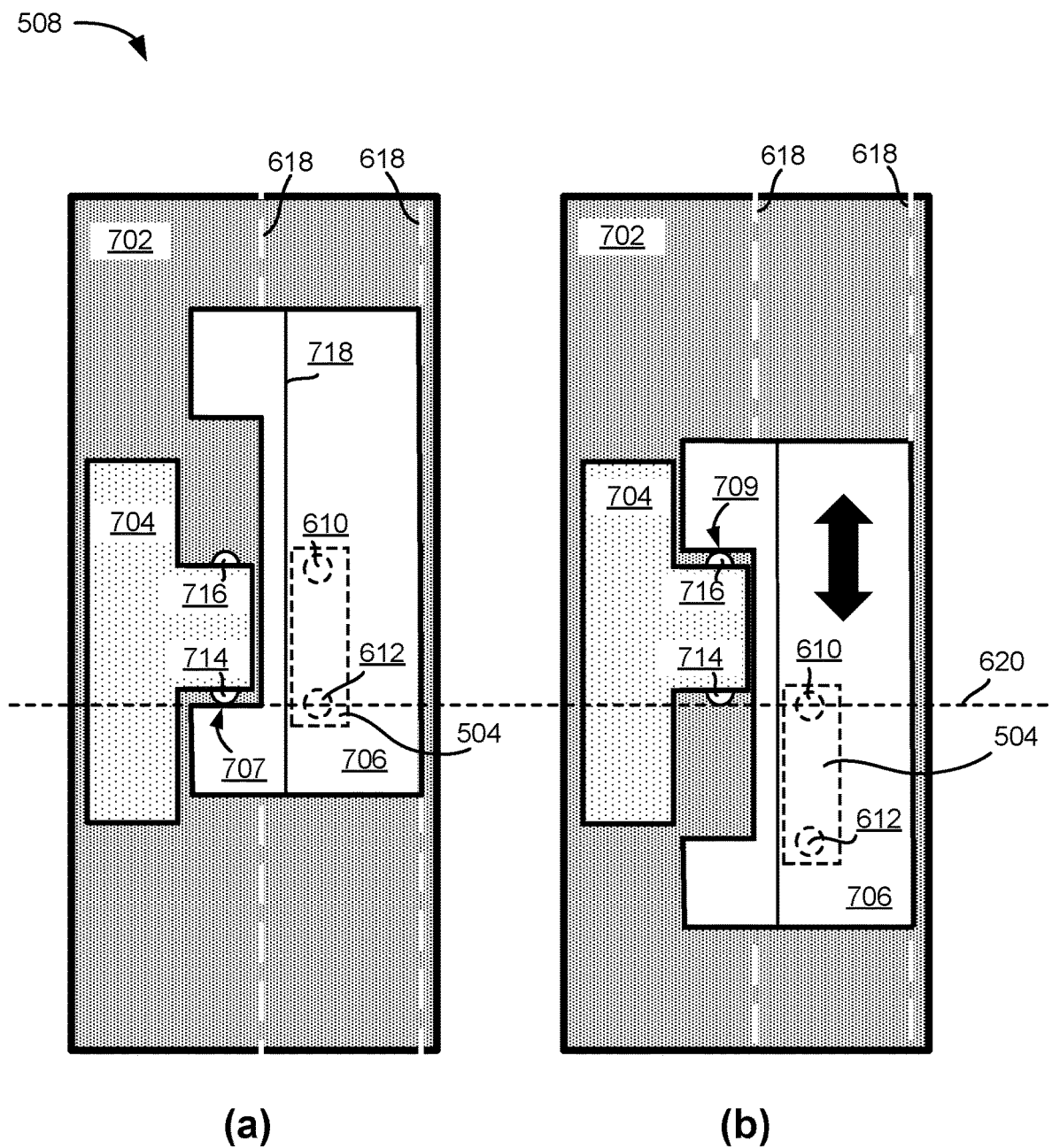
FIG. 7 is a schematic drawing of a top view of a precision stage, in accordance with one approach.

As shown in FIG. 7, a precision stage 508 according to another approach may have stops 714, 716 positioned on a guide 704. In some approaches, the guide 704 (e.g. yoke, u-shaped bracket, etc.) may be fixedly attached to the base 702. The movable portion 706 may be positioned above a base 702 and may be configured to move linearly (in a longitudinal direction arrow) along the base 702.

The extent of motion of the movable portion 706 being constrained by stops. In some approaches, a precise distance between two positions may define the extent of motion of the movable portion 706. In some approaches, the movable portion 706 may have a point of engagement 707, 709 for engaging the stops 714, 716 on the guide 704. The movable portion 706 may have a feature (e.g., slot 718) configured to position the sample 504 in a precise location.

Referring again to FIG. 5A, the apparatus 500 includes a device 512 for acquiring locations of the fiducial features of a sample 504, including the fiducial features, when the sample 504 is positioned at the target position. In one approach, the device 512 includes a camera for capturing images in the field of view of the camera. Optionally, the device 512 may include a light source for illuminating the fiducial features. Any type of camera may be used, ideally a digital camera with a resolution that enables counting pixels to the desired accuracy, e.g., to enable measurement to within the ranges disclosed herein, and ideally ≤1 nm. Any light source compatible with the camera and capable of illuminating the fiducial features may be used. In preferred approaches, the fiducial features are visible in a white light and/or ultraviolet (UV) microscope. Accordingly, the device 512 may include a microscope having a UV source and/or a white light source. For example, the device 512 may include a microscope having a UV source from a 365 nm LED. In another approach, the device 512 includes a monochrome camera for capturing images of the samples 504 when illuminated with the light source.

In one approach, a focusing mechanism of known type is provided for automatically focusing on the samples 504 when the samples 504 are positioned in the field of view of the device 512. The focusing mechanism may be integrated with the device 512. In one approach, the focusing mechanism may apply a method of pattern matching.

In another approach, the device 512 includes an atomic force microscope (AFM). In such approach, the height of the imaging portion of the AFM above the sample may be adjusted via the device 512. Even in these instances, it is desirable to perform a leveling operation as described elsewhere herein.

As should also become apparent to one skilled in the art, the field of view of the device 512 refers to the instrument field of view, which can be an optical field of view if the device is an imaging device, the field examined by an AFM as the tip of the AFM traverses an area of interest on the sample, etc.

Control software configured to control functionality and/or movement of any component of the apparatus 500 as well as process images of the fiducial features captured by the device 512 may be used. Such control software may run on the apparatus 500 itself, and/or on a computer 514 coupled to the apparatus 500, and in such case, the computer 514 may be considered part of the apparatus 500. Likewise, any functions performed by a computer coupled to the apparatus 500 may be considered part of the apparatus 500 itself, in some approaches. Finally, the apparatus 500 (e.g., via internal or external computer) may perform some of all of the control operations and/or calculations presented and/or implied here. For example, the apparatus 500 may include a processor and logic in one or more of the aforementioned computers configured to process the images of fiducial features of each of the samples 504 for determining a distance between the fiducial features to an accuracy of about ±50 nm or better, preferably ±25 nm or better, more preferably ±10 nm or better, even more preferably ±5 nm or better, and ideally ±1 nm or better.

The apparatus 500 may include several other features to enhance its functionality, in various aspects and approaches.

In one approach, a mechanism 516 for adjusting the inclination of the precision stage 508 relative to an optical axis of the device 512 may be present. The mechanism 516 may be of any known type, such as a piezoelectric actuator, worm screw, solenoid actuator, etc. The device 512 may be used to detect the surface of the precision stage and the mechanism 516 is used to level the precision stage 508 relative to the optical axis, for example by causing the x-y stage to move the precision stage to at least two different locations and detecting change in focus of the device 512, and subsequently correcting the inclination of the precision stage using the mechanism 516. This calibration procedure may be performed before the sample holder is added to the apparatus, but other approaches may include an opening in the sample holder that enables direct imaging of the precision stage therethrough.

In one approach, a mechanism 517 may be present for adjusting the inclination of the sample holder 502 to bring the fiducial features of the sample concurrently into a proper position for acquisition by the device 512. In a preferred aspect, the mechanism 517 is configured to level the sample 504 to be measured relative to an optical axis of the device 512. In one approach, a goniometer may be used. In the approach shown, the movable portion of the precision stage includes two pieces coupled together with a hinge 523, e.g., a hinge flexure or any other known type of hinge, on an end opposite the mechanism 517. The device may be used to detect the surface of the sample 504 and the mechanism 517 is used to level the sample 504 relative to the optical axis by pivoting the upper piece (e.g., as exemplified by the curved arrow). Preferably, the measuring is performed after the sample 504 is leveled.

Figure 5B:
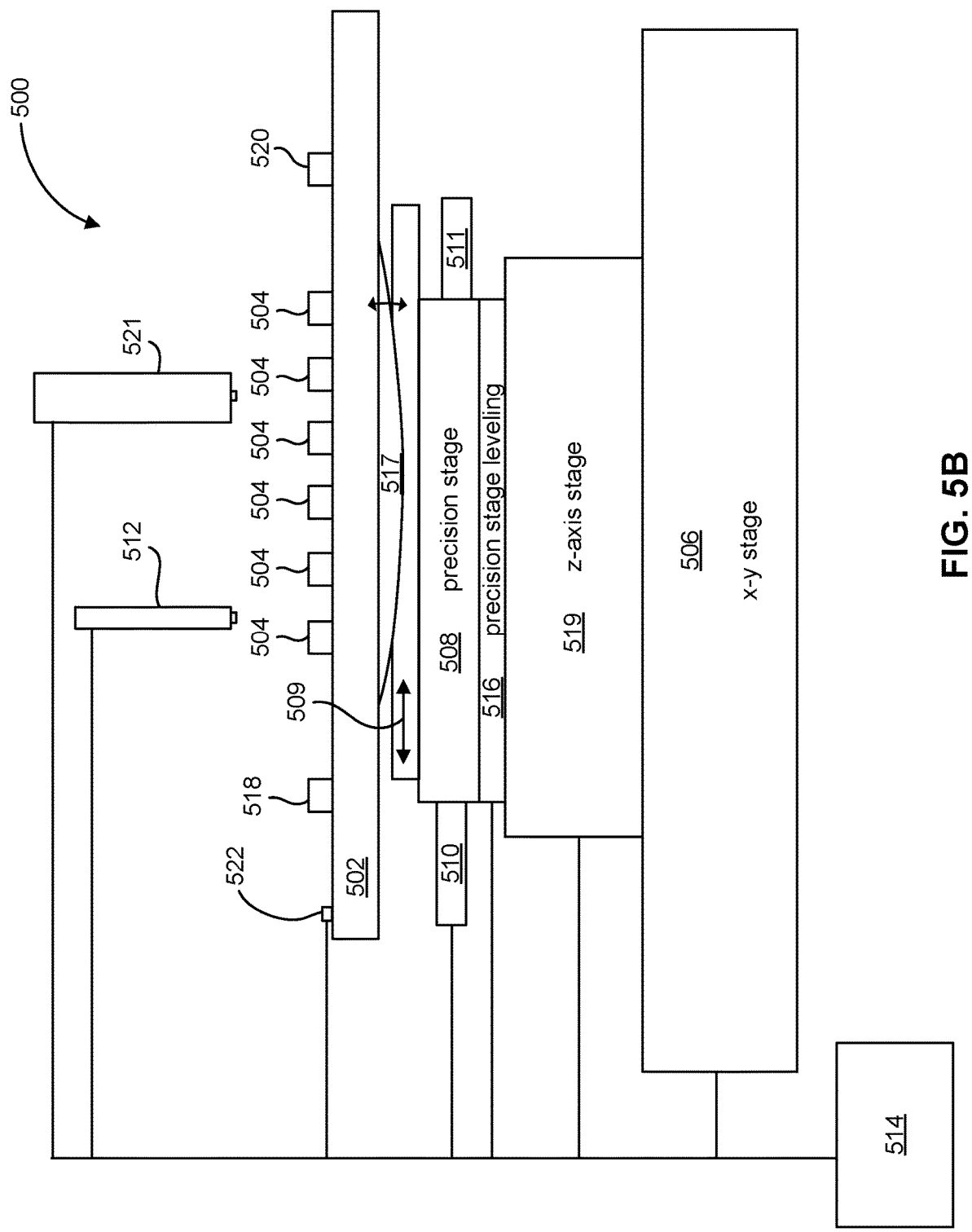
FIG. 5B is a schematic diagram of an apparatus, in accordance with one approach.

In another approach, shown in FIG. 5B, which is otherwise identical to the apparatus 500 of FIG. 5A except as noted herein, the mechanism 517 may include a goniometer.

The mechanism 517 thus adjusts the inclination of the fiducial feature pair within a sample 504 to a set point may be used such that both fiducial features are simultaneously in focus.

In some approaches, one or both of the aforementioned inclinations may be detected using an autocollimator 521, as shown in the apparatus 500 of FIG. 5B (which is otherwise identical to the apparatus 500 of FIG. 5A except as noted herein) and adjusted via mechanisms 517 and/or 519 as described above. The autocollimator may be used in addition to, or instead of, the device 512.

In one approach, a z-axis stage 519 is present for moving the samples vertically to move them into a proper position relative to the device 512 for enabling precise identification of edges of the fiducial features, which are used to determine the distance to be measured. Any type of known mechanism 519 may be used.

In one approach, the apparatus 500 includes a datum structure 518 in the sample holder 502 that is configured to align the samples 504 in a predefined manner, such as with longitudinal axes of the transducer arrays of tape head modules parallel to the direction of motion of the precision stage 508. Preferably, the samples 504 are positioned in the sample holder 502 such that the location of a first fiducial feature of each sample 504 relative to the datum structure 518 on the sample holder 502 is accurate to within approximately 10 micrometers or better.

In one approach, the apparatus 500 includes a reference standard 520 in the sample holder 502 that is usable to calibrate the apparatus 500. The reference standard 520 may or may not have fiducial features that mimic those in the sample samples 504. The distance between fiducial features on the reference standard 520 at a particular temperature is known and stored in a memory. Accordingly, the known coefficient of thermal expansion of the reference standard 520 may be used to calibrate the apparatus 500, and/or adjust the measurements to compensate for thermal expansion or contraction of the samples 504.

The reference standard 520 may take any suitable form. In one approach, the reference standard 520 is a quartz mask. In another approach, the reference standard 520 is a thin film structure. In yet another approach, the reference standard 520 is magnetic recording head, e.g., of a same type as the sample. In yet another approach, the reference standard 520 is a dummy structure having physical features similar to the samples.

A sensor 522 may be used to measure the temperature of the reference standard 520 and/or samples 504 during a test.

In some approaches, a control sample may be used in addition to, or instead of, the reference standard 520. The control sample may have features of known position, and be constructed in a similar manner as the samples 504 to be measured. In one approach, a reference standard 520 may be used to calibrate the span of the control sample.

Figure 8:
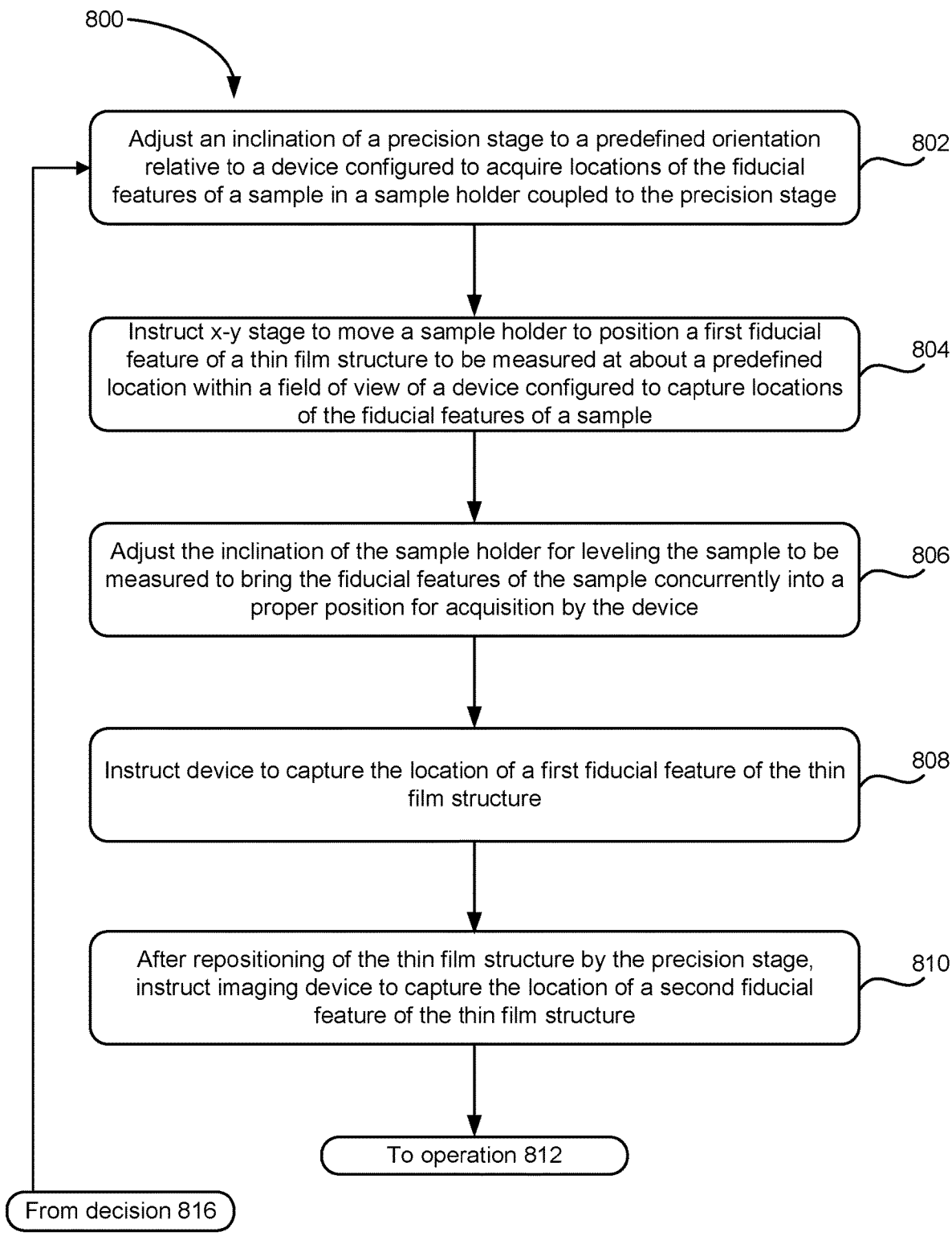
FIG. 8 is a flowchart of a method, in accordance with one approach.
Figure 8:
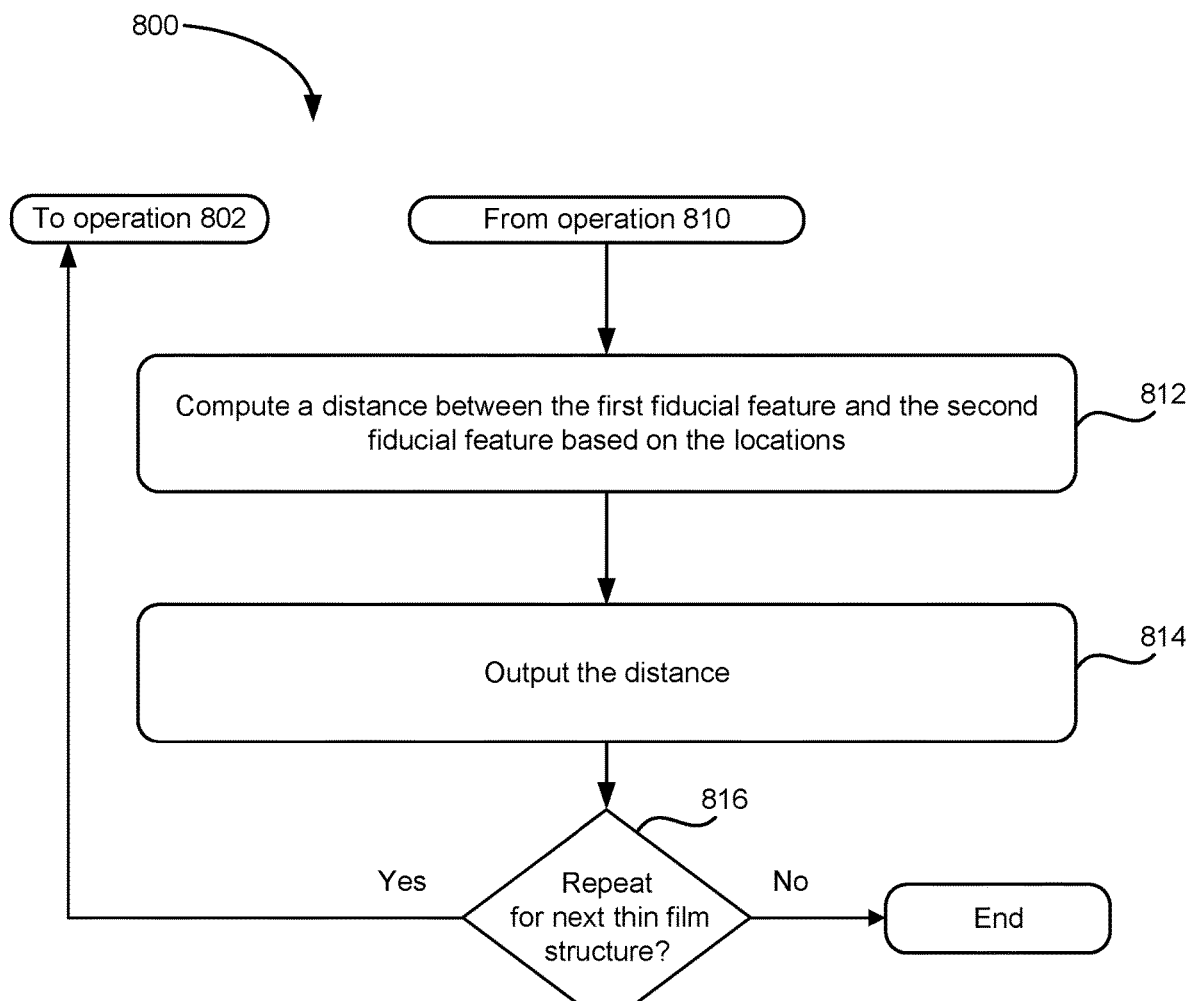

FIG. 8 depicts a method 800 for measuring a distance between features of a thin film device, in accordance with one aspect of the present invention. As an option, the present method 800 may be implemented in conjunction with apparatuses such as those shown in the other FIGS. described herein. Of course, however, this method 800 and others presented herein may be used to provide applications which may or may not be related to the illustrative approaches listed herein. Further, the methods presented herein may be carried out in any desired environment. Moreover, more or less operations than those shown in FIG. 8 may be included in method 800, according to various approaches. It should also be noted that any of the aforementioned features may be used in any of the approaches described in accordance with the various methods inferred by the many aspects of the present invention described herein.

Upon completion of loading the desired number of samples onto an apparatus (e.g., apparatus 500, FIG. 5A), optional preparatory operations may occur, e.g., to calibrate the apparatus, to adjust the inclination of a sample to be measured, etc. For example, the inclination of the precision stage relative to an optical axis of a device configured to acquire locations of the fiducial features of a sample may be performed. In addition, or alternatively, the inclination of the sample holder may equivalently be adjusted for leveling the sample to be measured relative to the operational axis of the device.

Any other operations described or alluded to in the description of the apparatus may be performed before and/or during the method 800.

Referring to operation 802, an inclination of a precision stage is adjusted to a predefined orientation relative to a device configured to acquire locations of the fiducial features of a sample in a sample holder coupled to the precision stage. The predefined orientation may be orthogonal to an optical axis of an optical imaging device, at a proper angle relative to the operational axis of an AFM, etc.). Feedback from the device itself may be used to obtain the proper inclination. As noted above, the precision stage is preferably configured to control an extent of movement of the sample along an axis for moving the selected one of the samples along the axis a precise predefined distance to within an accuracy of about ±50 nanometers or better.

In operation 804, an instruction is issued to an x-y stage to move the sample holder to position a first fiducial feature of the sample to within ±10 micrometers or better, more preferably to within ±2 micrometers or better, and ideally to within ±0.25 micrometers or better, in both x and y directions, of a predefined location in a field of view of the device. The predefined location may be a center of the field of view of the device, but can be any location within the field of view. Moreover, data received from the device may be used to assist in positioning the first fiducial feature at the predefined location.

In operation 806, the inclination of the sample holder is adjusted for leveling the sample to be measured to bring the fiducial features of the sample concurrently into a proper position for acquisition by the device.

In operation 808, the device is instructed to acquire a location of the first fiducial feature. Preferably, this operation includes capturing an image of the first fiducial feature.

In operation 810, in response to repositioning of the sample by the precision stage, the device is instructed to acquire a location of a second fiducial feature in the field of view of the device. As inferred above, an instruction may be provided to a mechanism that moves the precision stage.

In operation 812, the distance between the first fiducial feature and the second fiducial feature is computed based on the locations, e.g., as depicted in an image, as derived from AFM data, etc. to an accuracy of about ±50 nm or better, preferably ±25 nm or better, more preferably ±10 nm or better, even more preferably ±5 nm or better, and ideally ±1 nm or better. Any technique, known or otherwise, that would become apparent to one skilled in the art upon reading the present disclosure may be used to compute the distance. In one approach, the calculation may include overlaying the images and performing a pixel-by-pixel different function, e.g., by moving one image relative to the other and determining the pixel shifts that produce extinction in the difference function, and correlating the pixel shifts to actual distance. An illustrative method for determining distance is presented below with reference to FIG. 9. In one approach, operation 808 may include performing interpolation between pixels for achieving higher resolution.

In operation 814, the computed distance is output.

Operations 802-810 are repeated sequentially for additional ones of the samples until some or all of the samples positioned in the sample holder have been measured. See decision 816.

Preferably, operations 802-810 are performed for each thin film device in less than 300 seconds per thin film device, preferably in less than 100 seconds per thin film device, and more preferably in less than 60 seconds per thin film device.

Where the samples include modules for magnetic recording heads, the predefined distance may be a design distance of the span of transducers of the modules. The computed (actual) distance of the span of transducers can be accurately measured for each module, and the difference between the actual distance and the design distance determined. Such information can be used for many things, as would become apparent to one skilled in the art upon reading the present disclosure. For example, modules with a measured distance that is outside of tolerances can be discarded. The difference can be stored in a drive in which the module becomes installed, and used for such things as determining a tilt to apply to the module; determining whether to induce expansion or contraction of the head e.g., via thermal, piezoelectric, etc. mechanisms; etc.

Referring again to operation 808, in some approaches, the computation of the distance may include adjusting the predefined distance with a misregistration, for example, as determined from the comparison of the first image of the first fiducial feature with the second image of the second fiducial feature. In some approaches, the misregistration may be between fiducial feature locations in the first image and the second image.

Figure 9:
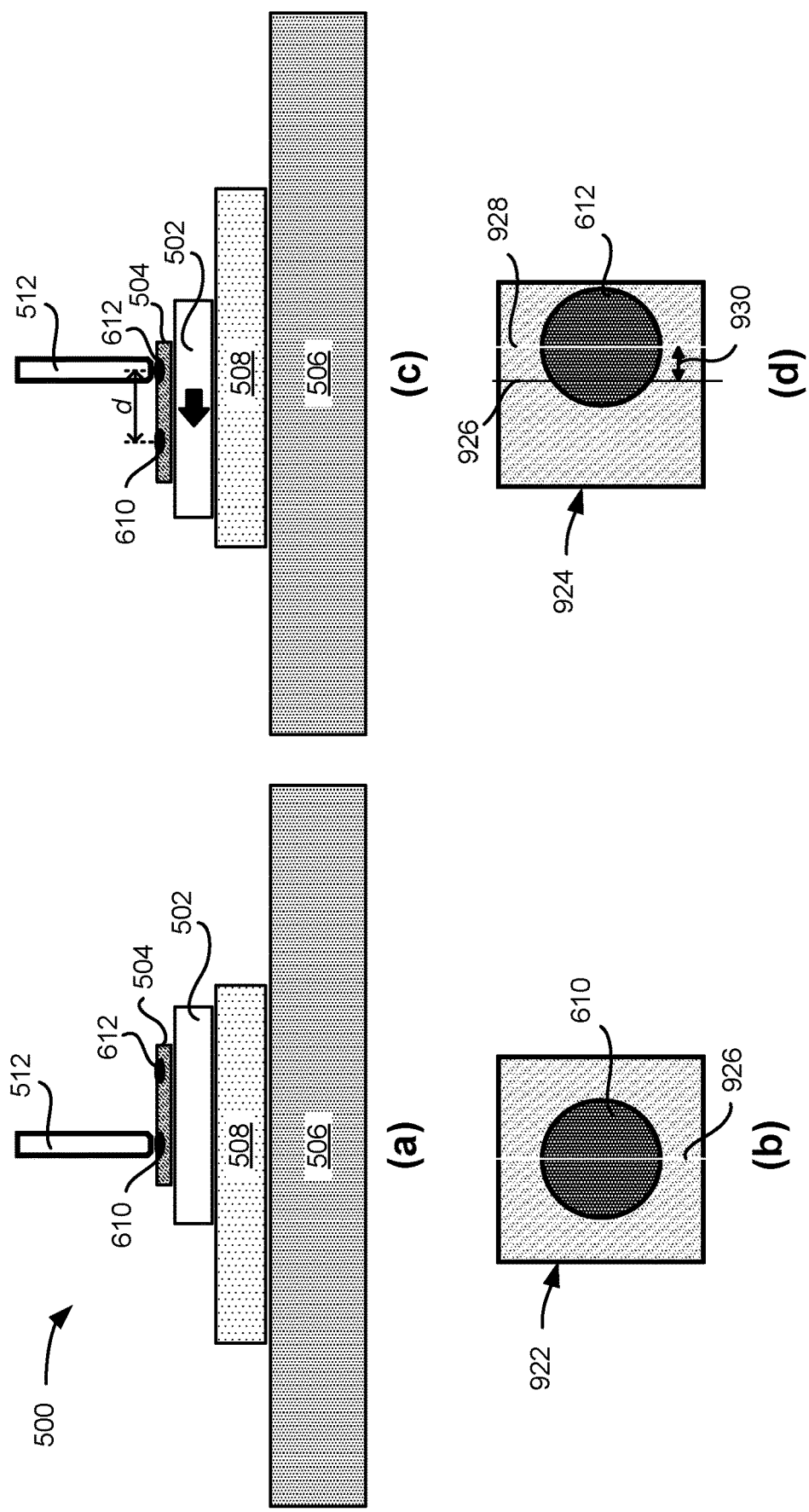
FIG. 9 is a sequence of drawing depicting use of an apparatus, in accordance with one approach.

In other approaches, the misregistration may include a misregistration of the first image to a reference line and a misregistration of the second image to the reference line. FIG. 9 shows an example of computing a misregistration relative to a reference line using an apparatus 500 such as the apparatus shown in FIGS. 5A and 5B. Part (a) of FIG. 9 depicts a first position of the sample holder 502 with a sample 504 having fiducial features 610, 612 to be imaged. The sample holder 502 is positioned above a precision stage 508, which is shown above an x-y stage 506. The device 512 generates a first image 922 (Part (b) of FIG. 9) of the first fiducial feature 610. The first image 922 may have a reference line 926 aligned with the first fiducial feature 610 of the sample 504. The reference line 926 of the first fiducial feature 610 may correspond to the centerline of the first fiducial feature 610, to some other notable reference mark, an edge of the fiducial feature, etc.

Part (c) of FIG. 9 depicts a second position of the sample holder 502 with the sample 504 and the imaging of the second fiducial feature 612 by the device 512. The sample holder 502 moves in a linear direction (arrow) a predefined distance d to the second fiducial feature 612 under the device 512. A second image 924 is generated by the device 512 of the second fiducial feature 612 as shown in part (d) of FIG. 9. The reference line 926 relative to the first fiducial feature 610 may be offset from the center line 928 of the second fiducial feature 612. The misregistration 930 between the reference line 926 of the first fiducial feature 610 and the center line 928 of the second fiducial feature 612 allows computation of the precise distance between the two fiducial features 610, 612 within 10 nm or better, and ideally to within ±1 nm or better. In some approaches, image overlay techniques may be used.

In some approaches, the misregistration between two images may be determined based on pixel displacement. For example, the images may be overlaid one atop the other, and the pixels between the fiducial features of interest may be counted and correlated to distance. In some approaches, the counting may be done by computer, or manually by a human viewing overlaid images. In preferred approaches, the two images may be compared using image processing software that may provide computations by image subtraction or other conventional technique to determine the pixel displacement between fiducial features of interest in the two images.

In some approaches, existing features of a sample may be used as the fiducial features in method 800 of FIG. 8. FIG. 10 illustrates an example (not meant to be limiting in any way) of using existing features of a sample as fiducial features for determining a distance between the features. FIG. 10 is a schematic drawing of a plane view of a hard bias junction of a TMR read transducer in a multichannel recording head die. The method as described herein may be used to determine a span deviation by measuring the distance between writer servo 1 and writer servo 2. In particular, as shown in FIG. 10, spans between hard bias junctions of servo readers may be a direct measurement of the magnetic spans. In some approaches using LTO heads, the transducer span is expected to be 2859 microns (µm). The sample may then be moved a defined distance in the direction of the arrow (as shown in FIG. 10) toward the second fiducial feature, or as illustrated, servo reader.

An image may then be generated of writer servo 2. Preferably, the same field of view is used for generating an image of writer servo 2 that includes the hard bias junction. Appropriate distances, e.g., d1 and d2, may be determined and used to calculate the distance between the features.

Alternatively, dedicated fiducial features may be used to determine uniformity of expansion and/or contraction over a greater length than the transducer span. Hard bias junctions and/or trackwidths of AMR, GMR, or TMR transducers may be used in various approaches of method 800. In some approaches, servo readers in writer modules may be used as non-dedicated fiducial features. In other approaches, write transducers may be used as non-dedicated fiducial features. In yet other approaches, dedicated fiducial features as described herein may be located within an existing array of data transducers and thereby may provide greater precision in determining span variation.

FIGS. 11A-11D depicts various approaches of a sample 504 having fiducial features that enable measuring of the span between fiducial features. As an option, the present sample 504 may be implemented in conjunction with fiducial features from any other approach listed herein, such as those described with reference to the other FIGS. Of course, however, such sample 504 and others presented herein may be used in various applications and/or in permutations which may or may not be specifically described in the illustrative approaches listed herein. Further, the sample 504 presented herein may be used in any desired environment.

According to one approach, the sample 504 has a plurality of elements, which may be exposed on the surface of the sample being viewed, embedded, or a combination of both. FIG. 11A is a plane view of a lapped surface 1120 of a sample 504. In some approaches, the sample 504 may have a plurality of elements 1110 exposed on the lapped surface 1120 of the sample 504. In an exemplary approach, the sample is a magnetic head die, wherein the elements are servo readers, each fiducial feature being positioned at a known position relative to a respective one of the servo readers.

In one approach, the sample 504 may include at least two fiducial features dedicated for enabling measurement therebetween, i.e., the fiducial features are not used for any other mechanical or electrical purpose in the final product. As shown in FIG. 11A, the sample 504 may have a plurality of fiducial features 1102*a*, 1102*b*, 1102*c*, 1102*d*, 1102*e* exposed on the lapped surface 1120 of the sample 504. In some approaches, the dedicated fiducial features 1102*a*, 1102*b*, 1102*c*, 1102*d*, 1102*e* may have narrow and thin rectangular shapes at precise locations.

In one approach, dedicated fiducial features at precise locations in the sample 504 may be used for plane view measurements, e.g., ends of the fiducial features are on an exposed surface of the sample. In some approaches, the plane view measurements using dedicated fiducial features may be used after the thin film fabrication processing and dicing of the recording head wafers but before assembly into the head module.

In some approaches, the fiducial features may be spaced at predetermined intervals within the sample (e.g. die). In some approaches, these fiducial features 1102a, 1102b, 1102c, 1102d, 1102e may be dedicated for enabling measurement of the span of distance d therebetween the fiducial features 1102a, 1102b, 1102c, 1102d, 1102e. In some approaches, the fiducial features 1102a, 1102b, 1102c, 1102d, 1102e may not be used for any other purpose.

In some approaches, the ends of the fiducial features may be exposed on the lapped surface, as shown in FIG. 11A. Moreover, each fiducial feature, for example fiducial features 1102d, 1102e, may be positioned at a known position relative to a respective one of the elements 1110, thereby allowing indirect measurement of the distance between elements.

In various approaches, e.g., as shown in FIG. 11A, the fiducial features may be narrow so as to fit in a field of view 1104 of a device configured to acquire locations of the fiducial features of a sample.

FIG. 11B illustrates a top down view (wafer view) of a plurality of fiducial features deposited on a plurality of thin films of a wafer 1108. In some approaches, each fiducial feature, for example, fiducial feature 1102d as shown in magnified view of circle 11D (FIG. 11D), may have a width w in a range of about 50 nm to about 2000 nm. In some approaches, a length/(also called stripe height) of each fiducial feature, for example fiducial feature 1102d in FIG. 11D, may be at least twice as long as the width w. In some approaches, the wafer view measurements using dedicated fiducial features may be used at one or more stages in the thin film fabrication processing of the recording head wafers.

FIG. 11C represents fiducial features 1102a, 1102b following cutting along line 11C in FIG. 11B. In various approaches, as shown in FIG. 11C, the fiducial features 1102a, 1102b may extend to the tape bearing surface 1124 and, thus, may be lapped and polished. In some approaches, the plated fiducial features 1102a, 1102b may be differentially etched to create a non-planar surface for enhanced imaging.

Figures 12A, 12B, 12C:
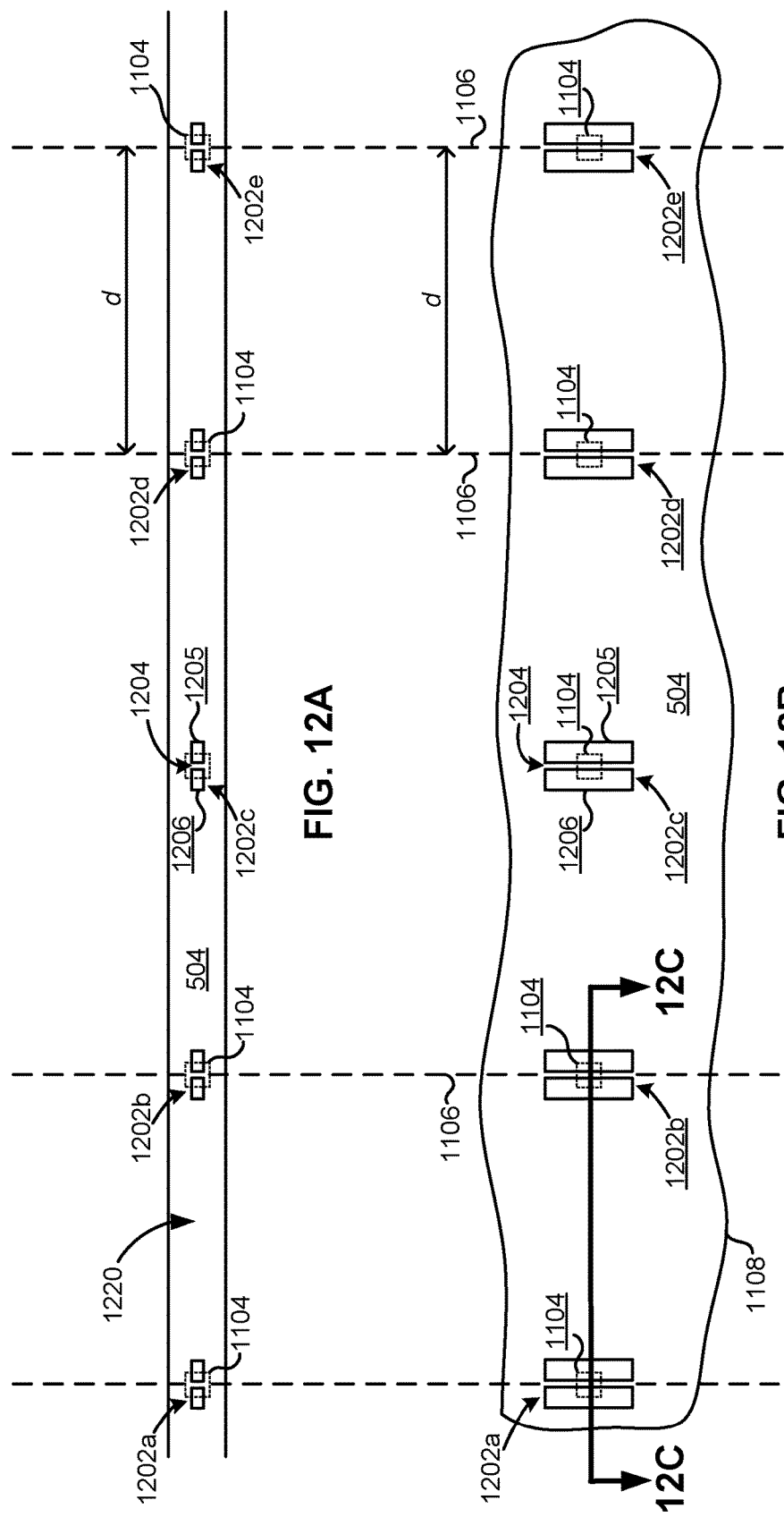
FIGS. 12A-12C depict various views of a sample having fiducial features that enable measuring of the span between fiducial features.

In various approaches, including the sample 504 of FIGS. 11A-11D and sample 504 of FIGS. 12A-12C, and others described herein, the dedicated fiducial features in a sample (e.g., magnetic recording head die) may include plated films, sputtered fiducial features, and/or other structures formed on or in the sample by conventional deposition techniques. Conventional photolithography may be used in conjunction with any deposition technique, as would be understood by one skilled in the art upon reading the present disclosure. In some approaches, each fiducial feature may be formed concurrently with elements of the samples.

In a preferred approach, the fiducial features are thin. For example, a deposition thickness of each fiducial feature may be in a range of about 25 nanometers (nm) to about 250 nm. Deposition of a thin fiducial feature may facilitate imaging in an AFM either immediately after forming the fiducial feature or at least prior to subsequent processing that may planarize the surface (as illustrated in FIGS. 11A and 11C). Thin fiducial features are more preferably used for the wafer view, as thin fiducial features are harder to image than thicker fiducial features in the plane view (lapped surface view). A low thickness is better for imaging in wafer view than thick fiducial features. Moreover, thin fiducial features can be more easily planarized on the wafer. The double bar fiducial feature of FIGS. 12A-12C can also have a low thickness.

For plane view measurements, thicker bars are more preferred, as they are easier to image. In various approaches, a deposition thickness of each bar is in a range of about 250 nanometers to about 3000 nanometers.

Combinations of thicker and relatively thinner, and/or wider and relatively narrower fiducial features, may be present in a single product.

In preferred approaches, the fiducial features may have a width w in a range of about 50 nm to about 2000 nm wide, and a deposition thickness in a range of about 500 nm to about 2000 nm.

In some approaches, the fiducial features may be patterned regions of a material used for defining critical fiducial features of the sample. For example, but not meant to be limiting, cobalt platinum hard bias magnet material may be used to form the fiducial features. Hard bias magnet films may be 60 to 80 nm thick and thus easily profiled in an atomic force microscope (AFM). In some approaches, the fiducial features may be profiled in a scanning electron microscope (SEM) during scanning of the die wafer surface. In the top down view of FIG. 11B, the field of view 1104 of the device may include the portion of the fiducial feature that lies along an imaginary reference line 1106, e.g., the centerline, of the fiducial feature.

In some approaches, the fiducial features of the sample may include suitable material well known by one skilled in the art. For example, illustrative materials may include a combination of nickel and iron, an alloy of nickel and iron, permalloy, a combination of nickel and chromium, an alloy of nickel and chromium (e.g. nichrome), etc. The lapped media bearing surface may typically not be perfectly planar, e.g. permalloy fiducial features may protrude above or be recessed from the surrounding material, which may be alumina, to facilitate imaging. In some approaches, devices may be etched to accentuate the surface profile height differences for optimized imaging.

In some approaches, regions patterned by photolithography may be used for electroplating thicker fiducial features at locations that may be determined by critical film features. Thicker fiducial features may be imaged for determining location thereof by scanning the tape bearing surface using an AFM. In so doing, the dedicated fiducial feature is preferably distinguished by its topography (as shown in FIG. 11C) relative to the proximate materials in the die.

FIGS. 12A-12C depict a sample 504 having dedicated fiducial features for enabling measurement of a span between the fiducial features, in accordance with various approaches. As an option, the present sample 504 may be implemented in conjunction with fiducial features from any other approach listed herein, such as those described with reference to the other FIGS. Of course, however, such sample 504 and others presented herein may be used in various applications and/or in permutations which may or may not be specifically described in the illustrative approaches listed herein. Further, the sample 504 presented herein may be used in any desired environment.

In one approach, a sample 504 may include a sample having a plurality of elements exposed on a lapped surface of the sample and at least two fiducial features dedicated for enabling measurement therebetween where each fiducial feature may include two bars preferably aligned parallel to each other and a space defined therebetween. FIG. 12A is a schematic drawing of a lapped surface 1220 of a sample 504 prior to fabricating the structure into a module. As shown in FIG. 12A, the sample 504 may have a plurality of fiducial features 1202a, 1202b, 1202c, 1202d, 1202e exposed on a lapped surface 1220 of the sample 504. Looking to fiducial feature 1202c, a fiducial feature 1202c may have two rectangle bars 1205, 1206 preferably aligned parallel to each other and a space 1204 defined therebetween. In addition, a reference line 1106 may be centered in the space 1204 between the two rectangle bars 1205, 1206 of the fiducial feature 1202c.

In some approaches, the space 1204 may have a width in a range of about 250 nanometers to about 3000 nanometers. Furthermore, a reference line 1106 oriented perpendicular to the lapped surface 1220 may be overlaid in the space 1204. The width and/or thickness of the bars 1205, 1206 may be similar or the same to the widths and thicknesses described elsewhere herein.

In one approach, a fiducial feature having two bars aligned parallel to each other with a space therebetween allows for the two bars, e.g. rectangle bars, to be larger than the fiducial features 1102a-e in FIGS. 11A-D, and thereby may facilitate processing. For instance, the two rectangle bars 1205, 1206 of fiducial feature 1202c may be large, i.e., larger than desired for imaging, the space 1204 therebetween is as small and narrow as each fiducial feature e.g. fiducial feature 1102c, formed in sample 504 (see FIGS. 11A and 11B). Thus, the reference line 1106 centered in the space 1204, where the space may be 250 nm to 3000 nm wide, results in greater precision in the image generated from the fiducial feature in the field of view 1104 of the device configured to acquire locations of the fiducial features of a sample (as illustrated in both in lapped surface view FIG. 12A and top down wafer view FIG. 12B).

FIG. 12C represents fiducial features 1202a, 1202b following deposition when the wafer 1208 and thin films are cut along 12C in FIG. 12B. In various approaches, as shown in FIG. 12C, the plated fiducial features 1202a, 1202b may extend to the tape bearing surface and, thus may be lapped and polished. In some approaches, the plated fiducial features 1202a, 1202b may be differentially etched to create a non-planar surface for AFM imaging. In preferred approaches, the fiducial features 1202a, 1202b may have a width w in a range of about 500 nm to about 2000 nm wide, and a deposition thickness in a range of about 500 nm to about 2000 nm.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
   a sample holder for holding a plurality of discrete samples having fiducial features thereon;
   a device configured to acquire locations of the fiducial features of the samples positioned in the sample holder;
   an x-y stage configured to move the sample holder along an x-y plane for selectively positioning a first fiducial feature of a selected one of the samples to within ±10 micrometers or better of a predefined location in a field of view of the device in both x and y directions; and
   a precision stage configured to control an extent of movement of the selected one of the samples along an axis a predefined distance to an accuracy of about ±50 nanometers or better.

2. The apparatus as recited in claim 1, wherein the sample holder holds at least three samples arranged in at least two parallel rows.

3. The apparatus as recited in claim 1, wherein the samples include modules for magnetic recording heads.

4. The apparatus as recited in claim 3, wherein the sample holder comprises a datum structure configured to align longitudinal axes of transducer arrays of the modules parallel to a direction of motion of the precision stage.

5. The apparatus as recited in claim 3, wherein the predefined distance is a design distance of the span of transducers of the modules.

6. The apparatus as recited in claim 1, comprising a mechanism for causing a relative motion between the device configured to acquire the locations of the fiducial features and the selected one of the samples for adjusting a distance therebetween.

7. The apparatus as recited in claim 1, wherein the precision stage is configured to move between two endpoints.

8. The apparatus as recited in claim 7, wherein the endpoints are stops.

9. The apparatus as recited in claim 1, wherein the precision stage is configured to move between two endpoints, and comprising at least one noncontacting device.

10. The apparatus as recited in claim 1, wherein the precision stage comprises a first rod fixed to a moveable portion of the precision stage; and
    a pair of second rods positioned parallel to each other in a longitudinal direction, wherein the second rods are positioned perpendicular to a longitudinal direction of the first rod, wherein the first rod is positioned between each of the pair of second rods.

11. The apparatus as recited in claim 10, wherein a material of the first rod and the pair of second rods includes polycrystalline alumina.

12. The apparatus as recited in claim 11, wherein a material of a support structure of the second rods is a material selected from the group consisting of: titanium, sapphire, quartz, and AlTiC.

13. The apparatus as recited in claim 11, wherein a material of a support structure of the second rods has a coefficient of thermal expansion substantially equal to a coefficient of thermal expansion of the samples.

14. The apparatus as recited in claim 1, comprising a mechanism for adjusting an inclination of the precision stage relative to an optical axis of the device.

15. The apparatus as recited in claim 1, comprising a reference standard in the sample holder, the reference standard having fiducial features and a defined coefficient of thermal expansion, wherein a distance between the fiducial features on the reference standard at a particular temperature is known.

16. The apparatus as recited in claim 15, wherein the reference standard is selected from the group consisting of: a quartz mask, a thin film structure, a magnetic recording head, and a dummy structure.

17. The apparatus as recited in claim 1, comprising a sensor configured to measure a temperature of the samples in the sample holder.

18. The apparatus as recited in claim 1, wherein the device includes a microscope and a camera.

19. The apparatus as recited in claim 1, wherein the device includes an ultraviolet light source.

20. The apparatus as recited in claim 1, comprising a processor and logic configured to process images of the fiducial features of each of the samples for determining a distance between the fiducial features to an accuracy of about ±50 nanometers or better.

21. The apparatus as recited in claim 1, comprising a mechanism for adjusting an inclination of the sample holder for leveling the sample to be measured to bring the fiducial features of the sample concurrently into a proper position for acquisition by the device.

22. The apparatus as recited in claim 1, comprising an autocollimator for detecting an inclination selected from the group consisting of an inclination of the sample holder relative to an optical axis of the device and an inclination of the sample relative to the optical axis of the device.

23. A method for measuring distances between fiducial features of samples, the method comprising:
adjusting an inclination of a precision stage to a predefined orientation relative to a device configured to acquire locations of the fiducial features of a sample in a sample holder coupled to the precision stage, the precision stage being configured to control an extent of movement of the sample along an axis for moving the sample along the axis a precise predefined distance to within an accuracy of about ±50 nanometers or better;
instructing an x-y stage to move the sample holder to position a first fiducial feature of the sample to within ±10 micrometers or better of a predefined location in a field of view of the device,
causing adjustment to the inclination of the sample holder for leveling the sample to be measured to bring the fiducial features of the sample concurrently into a proper position for acquisition by the device;
instructing the device to acquire a location of the first fiducial feature;
in response to repositioning of the sample the precise predefined distance along the axis by the precision stage, instructing the device to acquire a location of a second fiducial feature in the field of view of the device;
computing the distance between the first fiducial feature and the second fiducial feature based on the locations to an accuracy of about ±50 nanometers or better;
outputting the computed distance; and
repeating the foregoing operations for additional samples positioned in the sample holder.

24. The method as recited in claim 23, wherein the operations are performed for each thin film device in less than 300 seconds per thin film device.

25. The method as recited in claim 23, wherein the extent of movement of the precision stage is controlled in part by a noncontact device.

* * * * *